(12) United States Patent
Kuczek et al.

(10) Patent No.: US 12,348,084 B2
(45) Date of Patent: Jul. 1, 2025

(54) ELECTRIC MACHINE HAVING MULTI-FUNCTION COOLING CHANNELS

(71) Applicant: HAMILTON SUNDSTRAND CORPORATION, Charlotte, NC (US)

(72) Inventors: Andrzej E. Kuczek, Bristol, CT (US); Jagadeesh K. Tangudu, South Windsor, CT (US); Kimberly R. Saviers, Glastonbury, CT (US); Joseph E. Turney, Amston, CT (US); Abbas A. Alahyari, Glastonbury, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 309 days.

(21) Appl. No.: 18/081,010

(22) Filed: Dec. 14, 2022

(65) Prior Publication Data

US 2024/0204587 A1   Jun. 20, 2024

(51) Int. Cl.
*H02K 1/20* (2006.01)
*B64D 27/24* (2006.01)
*B64D 33/08* (2006.01)
*H02K 9/19* (2006.01)

(52) U.S. Cl.
CPC ............ *H02K 1/20* (2013.01); *B64D 27/24* (2013.01); *B64D 33/08* (2013.01); *H02K 9/19* (2013.01); *B64D 2221/00* (2013.01)

(58) Field of Classification Search
CPC ............ H02K 1/20; H02K 9/19; H02K 21/12; H02K 5/203; H02K 1/27; H02K 1/18; H02K 3/24; B64D 33/08; B64D 27/24
See application file for complete search history.

(56) References Cited

U.S. PATENT DOCUMENTS

| 9,444,293 B2 | 9/2016 | Yoshinori et al. | |
|---|---|---|---|
| 11,255,215 B2 | 2/2022 | Snyder | |
| 2003/0001440 A1* | 1/2003 | Bourqui | H02K 3/38 310/43 |
| 2007/0024249 A1* | 2/2007 | Dooley | H02K 16/04 310/216.106 |

(Continued)

FOREIGN PATENT DOCUMENTS

WO   2022173418 A1   8/2022

OTHER PUBLICATIONS

European Search Report, Application No. EP 23202961.1-1202; issued Apr. 3, 2024; 11 pages.

*Primary Examiner* — Leda T Pham
(74) *Attorney, Agent, or Firm* — CANTOR COLBURN LLP

(57) ABSTRACT

Stators for aircraft electric motors include a cantilever structure having a supported end and an unsupported end, wherein the cantilever structure includes an inlet support manifold and an outlet support manifold arranged at the supported end and a plurality of cooling plates extending from the inlet support manifold and the outlet support manifold to the unsupported end. A plurality of coils are arranged between and in thermal contact with the cooling plates and a core passes through the plurality of coils and the plurality of cooling plates. Each cooling plate defines a cooling channel that fluidly couples the inlet support manifold and the outlet support manifold, and the coils and the core are structurally supported by the plurality of cooling plates in a cantilevered manner at the supported end.

20 Claims, 19 Drawing Sheets

(56) References Cited

U.S. PATENT DOCUMENTS

2012/0013207 A1    1/2012   Chamberlin et al.
2014/0015349 A1*   1/2014   Chamberlin ........... H02K 3/345
                                                           310/43
2022/0320929 A1    10/2022   Tangudu et al.

* cited by examiner

ELECTRIC MACHINE HAVING MULTI-FUNCTION COOLING CHANNELS

STATEMENT REGARDING FEDERALLY SPONSORED RESEARCH OR DEVELOPMENT

This invention was made with government support under Contract No. DE-AR0001351 awarded by the U.S. Department of Energy. The government has certain rights in the invention.

BACKGROUND

The present disclosure relates to electric motors, and more particularly, to electric motor assemblies with high efficiency and power density having improved cooling and structure for aircraft applications.

Traditional electric motors may include a stator and a rotor, with electrical motor windings in the stator that, when energized, drive rotation of the rotor about a central axis. Permanent magnet motors are widely used for high power density and efficient applications in aviation industry. The high torque density can be achieved by maximizing the magnetic loading through implementation of the Halbach array permanent magnet rotor structure; however, the dense permanent magnets can be a major barrier when minimizing the weight of the application. Accordingly, improved electric motor components may be used to improve the weight of such electric motors while also provide additional benefits, such as improved power density and the like.

BRIEF DESCRIPTION

According to some embodiments, stators for aircraft electric motors are provided. The stators include a cantilever structure having a supported end and an unsupported end, wherein the cantilever structure includes an inlet support manifold and an outlet support manifold arranged at the supported end and a plurality of cooling plates extending from the inlet support manifold and the outlet support manifold to the unsupported end, a plurality of coils arranged between and in thermal contact with the cooling plates, and a core passing through the plurality of coils and the plurality of cooling plates. Each cooling plate defines a cooling channel that fluidly couples the inlet support manifold and the outlet support manifold, and the coils and the core are structurally supported by the plurality of cooling plates in a cantilevered manner at the supported end.

In addition to one or more of the features described herein, or as an alternative, further embodiments of the stators may include that the cantilever structure defines an annular shape and defining an axis through a center of the annular shape.

In addition to one or more of the features described herein, or as an alternative, further embodiments of the stators may include that the inlet support manifold is arranged radially outward from the outlet support manifold.

In addition to one or more of the features described herein, or as an alternative, further embodiments of the stators may include that each of the inlet support manifold and the outlet support manifold are arranged at the same axial position relative to the axis through the center of the annular shape.

In addition to one or more of the features described herein, or as an alternative, further embodiments of the stators may include a bonding material configured to bond the plurality of cooling plates, the core, and the plurality of coils together.

In addition to one or more of the features described herein, or as an alternative, further embodiments of the stators may include that the bonding material comprises at least one of an epoxy material, a thermoset material, a thermoplastic material, or a polymer material.

In addition to one or more of the features described herein, or as an alternative, further embodiments of the stators may include a plurality of magnetic teeth wherein the cooling plates define gaps between adjacent cooling plates and each gap includes a coil of the plurality of coils and a magnetic tooth of the plurality of magnetic teeth.

In addition to one or more of the features described herein, or as an alternative, further embodiments of the stators may include that the inlet support manifold defines an inlet cavity therein and the outlet support manifold defines an outlet cavity therein, wherein the inlet cavity is fluidly coupled to the outlet cavity by the cooling channels within the plurality of cooling plates.

In addition to one or more of the features described herein, or as an alternative, further embodiments of the stators may include that the inlet support manifold defines a first inlet cavity and a second inlet cavity, wherein the first inlet cavity is fluidly coupled to the second inlet cavity by at least one metering aperture and the second inlet cavity is fluidly coupled to the cooling channels of the plurality of cooling plates.

In addition to one or more of the features described herein, or as an alternative, further embodiments of the stators may include a cooling fluid within the cooling channels of the plurality of cooling plates.

According to some embodiments, aircraft electric motors are provided. The aircraft electric motors include an annular rotor comprising a plurality of magnets and an annular stator arranged relative to the annular rotor and configured to cause rotation of the annular rotor. The annular stator includes a cantilever structure having a supported end and an unsupported end, wherein the cantilever structure includes an inlet support manifold and an outlet support manifold arranged at the supported end and a plurality of cooling plates extending from the inlet support manifold and the outlet support manifold to the unsupported end, a plurality of coils arranged between and in thermal contact with the cooling plates, and a core passing through the plurality of coils and the plurality of cooling plates. Each cooling plate defines a cooling channel that fluidly couples the inlet support manifold and the outlet support manifold and the coils and the core are structurally supported by the plurality of cooling plates in a cantilevered manner at the supported end.

In addition to one or more of the features described herein, or as an alternative, further embodiments of the aircraft electric motor may include that the cantilever structure defines an annular shape and defining an axis through a center of the annular shape.

In addition to one or more of the features described herein, or as an alternative, further embodiments of the aircraft electric motor may include a bonding material configured to bond the plurality of cooling plates, the core, and the plurality of coils together.

In addition to one or more of the features described herein, or as an alternative, further embodiments of the aircraft electric motor may include a plurality of magnetic teeth wherein the cooling plates define gaps between adjacent cooling plates and each gap includes a coil of the plurality of coils and a magnetic tooth of the plurality of magnetic teeth.

In addition to one or more of the features described herein, or as an alternative, further embodiments of the aircraft electric motor may include that the inlet support manifold defines an inlet cavity therein and the outlet support manifold defines an outlet cavity therein, wherein the inlet cavity is fluidly coupled to the outlet cavity by the cooling channels within the plurality of cooling plates.

In addition to one or more of the features described herein, or as an alternative, further embodiments of the aircraft electric motor may include that the inlet support manifold defines a first inlet cavity and a second inlet cavity, wherein the first inlet cavity is fluidly coupled to the second inlet cavity by at least one metering aperture and the second inlet cavity is fluidly coupled to the cooling channels of the plurality of cooling plates.

According to some embodiments, aircraft are provided. The aircraft include at least one aircraft electric motor, at least one electrical device, and a power distribution system configured to distribute power from the at least one electric motor to the at least one electrical device. The at least one aircraft electric motor includes a rotor assembly comprising a plurality of magnets arranged on a magnet support, an output shaft operably coupled to the rotor assembly, and a stator assembly arranged relative to the rotor assembly and configured to cause rotation of the rotor assembly. The stator assembly includes a cantilever structure having a supported end and an unsupported end, wherein the cantilever structure includes an inlet support manifold and an outlet support manifold arranged at the supported end and a plurality of cooling plates extending from the inlet support manifold and the outlet support manifold to the unsupported end, a plurality of coils arranged between and in thermal contact with the cooling plates, and a core passing through the plurality of coils and the plurality of cooling plates. Each cooling plate defines a cooling channel that fluidly couples the inlet support manifold and the outlet support manifold and wherein the coils and the core are structurally supported by the plurality of cooling plates in a cantilevered manner at the supported end.

In addition to one or more of the features described herein, or as an alternative, further embodiments of the aircraft may include a plurality of magnetic teeth wherein the cooling plates define gaps between adjacent cooling plates and each gap includes a coil of the plurality of coils and a magnetic tooth of the plurality of magnetic teeth.

In addition to one or more of the features described herein, or as an alternative, further embodiments of the aircraft may include that the inlet support manifold defines an inlet cavity therein and the outlet support manifold defines an outlet cavity therein, wherein the inlet cavity is fluidly coupled to the outlet cavity by the cooling channels within the plurality of cooling plates.

In addition to one or more of the features described herein, or as an alternative, further embodiments of the aircraft may include that the inlet support manifold defines a first inlet cavity and a second inlet cavity, wherein the first inlet cavity is fluidly coupled to the second inlet cavity by at least one metering aperture and the second inlet cavity is fluidly coupled to the cooling channels of the plurality of cooling plates.

The foregoing features and elements may be combined in various combinations without exclusivity, unless expressly indicated otherwise. Features which are described in the context of separate aspects and embodiments may be used together and/or be interchangeable. Similarly, features described in the context of a single embodiment may also be provided separately or in any suitable subcombination. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

DETAILED DESCRIPTION

Figure 1A:
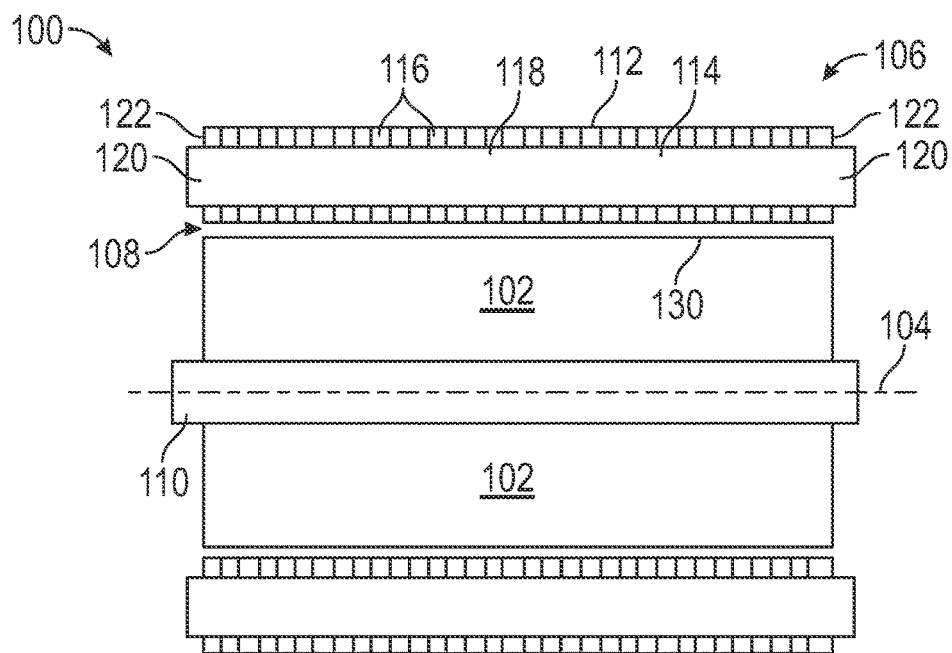
FIG. 1A is a partial view of an embodiment of electric motor.
Figure 1B:
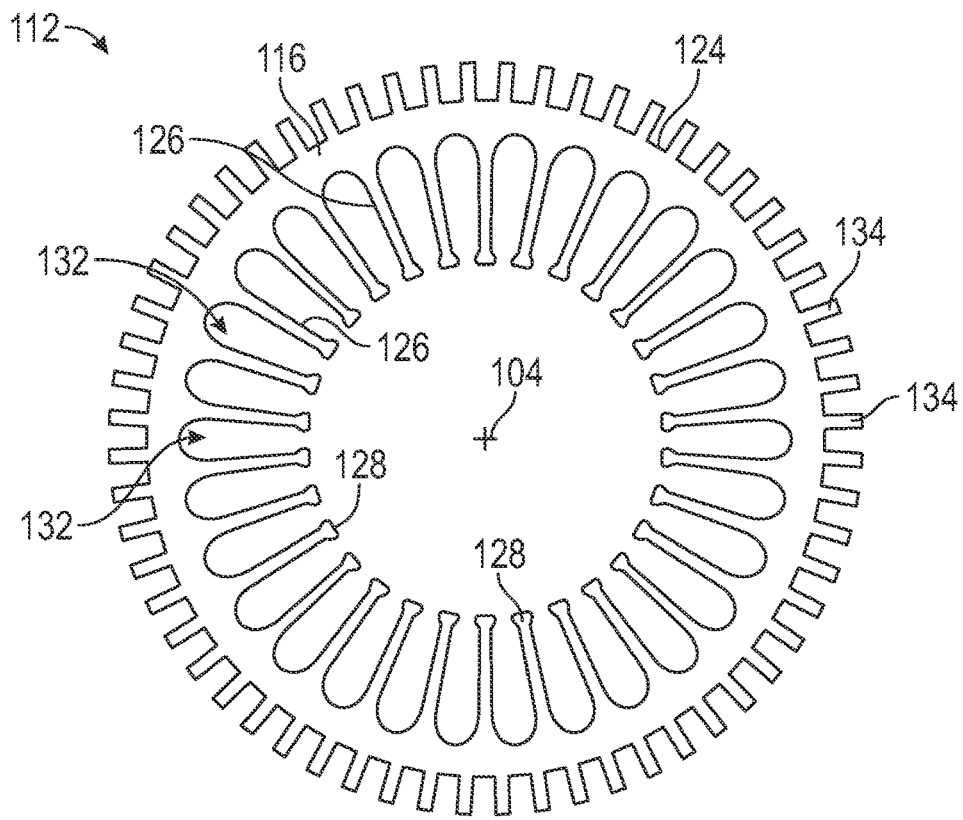
FIG. 1B is a cross-sectional view of an embodiment of a stator core of the electric motor of FIG. 1A.

Referring to FIGS. 1A-1B, schematic illustrations of an electric motor 100 that may incorporate embodiments of the present disclosure are shown. FIG. 1A illustrates a cross-sectional view of the electric motor 100 and FIG. 1B illustrates a cross-sectional view of a stator core of the electric motor 100. The electric motor 100 includes a rotor 102 configured to rotate about a rotation axis 104. A stator 106 is located radially outboard of the rotor 102 relative to the rotation axis 104, with a radial airgap 108 located between the rotor 102 and the stator 106. As illustrated, the rotor 102 may be mounted on a shaft 110 which may impart rotational movement to the rotor 102 or may be driven by rotation of the rotor 102, as will be appreciated by those of skill in the art. The rotor 102 and the shaft 110 may be fixed together such that the rotor 102 and the shaft 110 rotate about the rotation axis 104 together as one piece.

The stator 106 includes a stator core 112 in which a plurality of electrically conductive stator windings 114 are disposed. In some embodiments, such as shown in FIG. 1A, the stator core 112 is formed from a plurality of axially stacked laminations 116, which are stacked along the rotation axis 104. In some embodiments, the laminations 116 are formed from a steel material, but one skilled in the art will readily appreciate that other materials may be utilized. The stator windings 114, as shown, include core segments 118 extending through the stator core 112 and end turn segments 120 extending from each axial stator end 122 of the stator core 112 and connecting circumferentially adjacent core segments 118. When the stator windings 114 are energized via an electrical current therethrough, the resulting field drives rotation of the rotor 102 about the rotation axis 104. Although FIG. 1A illustrates the stator core 112 arranged radially inward from the stator windings 114, it will be appreciated that other configurations are possible without departing from the scope of the present disclosure. For example, in some embodiments, the stator structure may be arranged radially inward from a rotating rotor structure.

FIG. 1B is an axial cross-sectional view of the stator core 112. Each lamination 116 of the stator core 112 includes a radially outer rim 124 with a plurality of stator teeth 126 extending radially inwardly from the outer rim 124 toward the rotation axis 104. Each of the stator teeth 126 terminate at a tooth tip 128, which, together with a rotor outer surface 130 (shown in FIG. 1A) of the rotor 102, may define the radial airgap 108. Circumferentially adjacent stator teeth 126 define an axially-extending tooth gap 132 therebetween. Further, in some embodiments, a plurality of stator fins 134 extend radially outwardly from the outer rim 124.

Electric motors, as shown in FIGS. 1A-1B may require cooling due to high density configurations, various operational parameters, or for other reasons. For example, high-power-density aviation-class electric motors and drives may require advanced cooling technologies to ensure proper operation of the motors/drives. These machines are generally thermally limited at high power ratings and their performance can be improved by mitigating thermal limitations. To maintain desired temperatures, a thermal management system (TMS) is integrated into the system, which provides cooling to components of the system. Onboard an aircraft, power requirements, and thus thermal management system (TMS) loads, are substantially higher during takeoff. Sizing of the TMS for takeoff conditions (i.e., maximum loads) results in a TMS having a high weight to accommodate such loads. This results in greater weight and lower power density during cruise conditions which do not generate such loads, and thus does not require a high cooling capacity TMS. Balancing weight constraints and thermal load capacities is important for such aviation applications.

In view of such considerations, improved aviation electric motors are provided herein. The aviation electric motors or aircraft electric motors, described herein, incorporate lightweight materials and compact design to reduce weight, improve thermal efficiencies, improve power efficiencies, and improve power density.

Figure 2A:
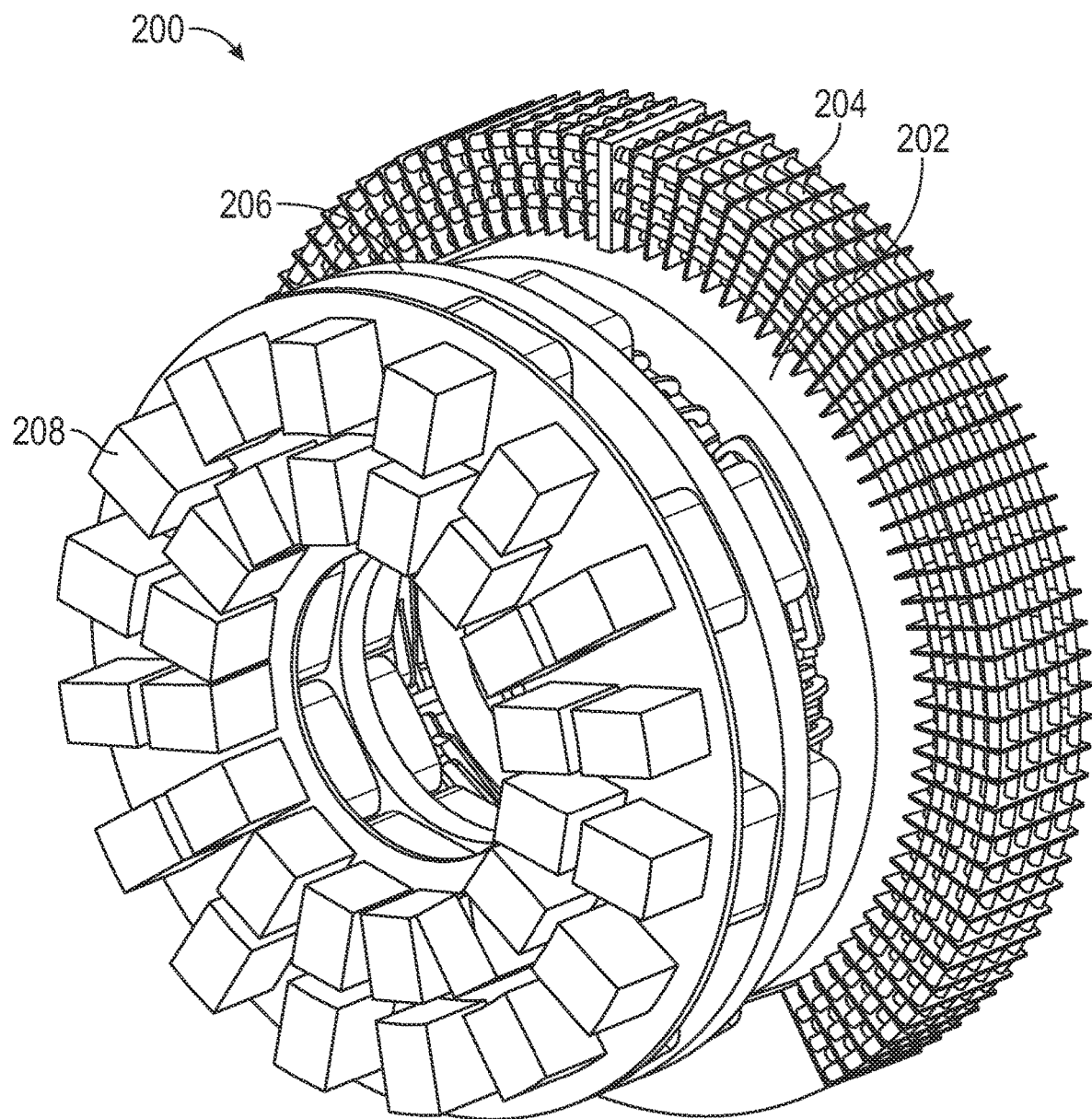
FIG. 2A is a schematic illustration of an aircraft electric motor in accordance with an embodiment of the present disclosure.
Figure 2B:
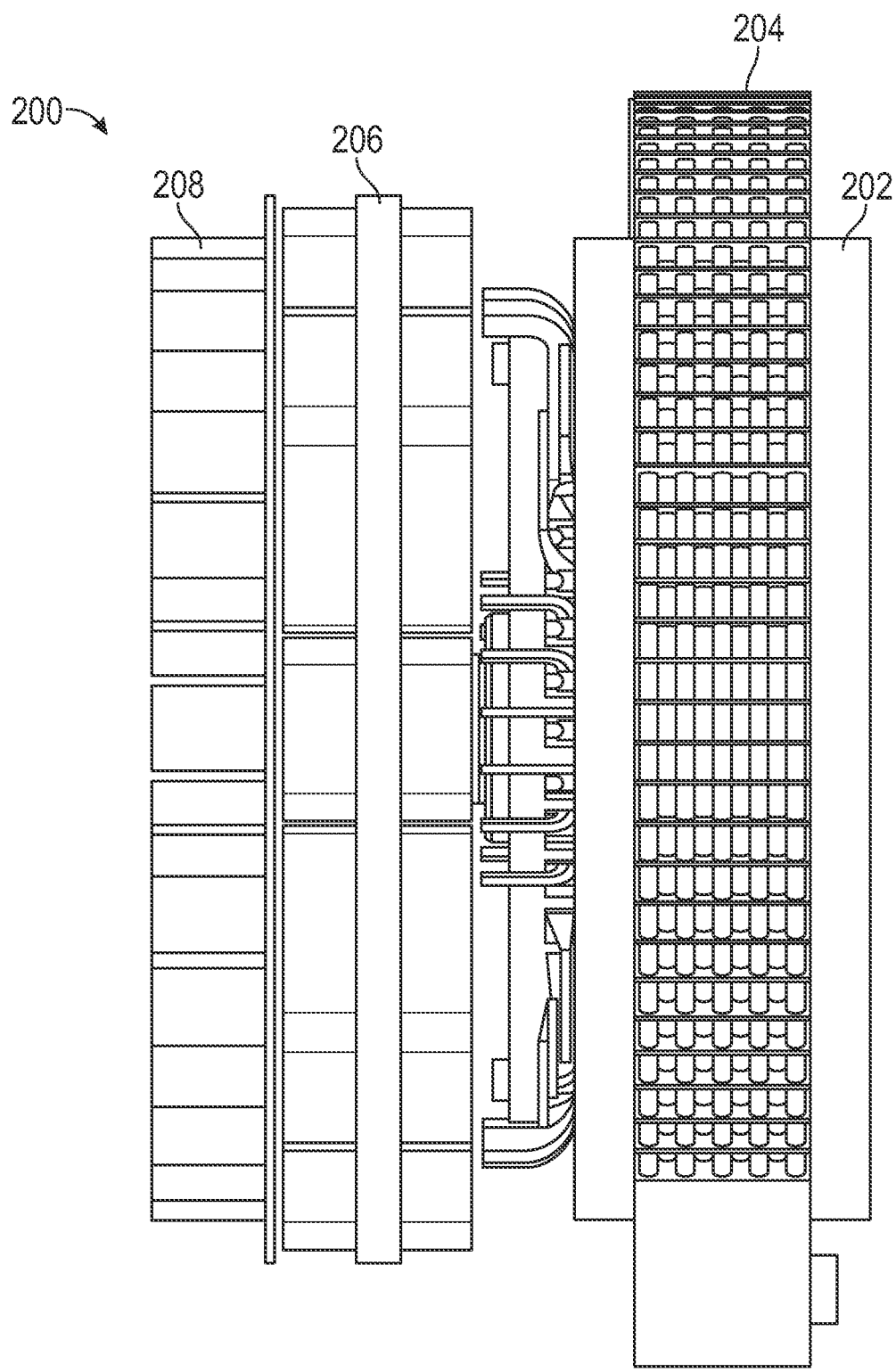
FIG. 2B is a side elevation view of the aircraft electric motor of FIG. 2A.
Figure 2C:
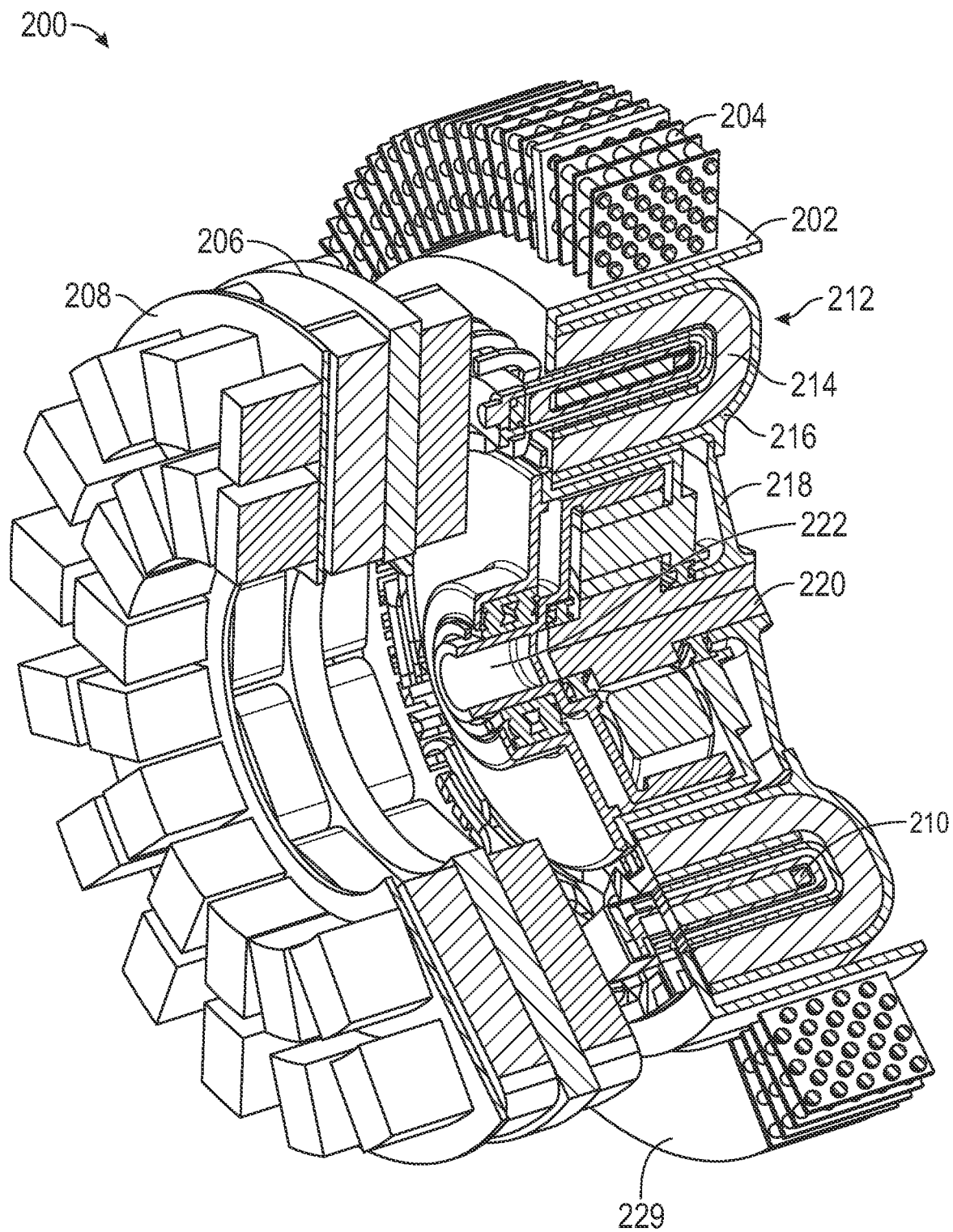
FIG. 2C is a partial cut-away illustration of the aircraft electric motor of FIG. 2A.
Figure 2D:
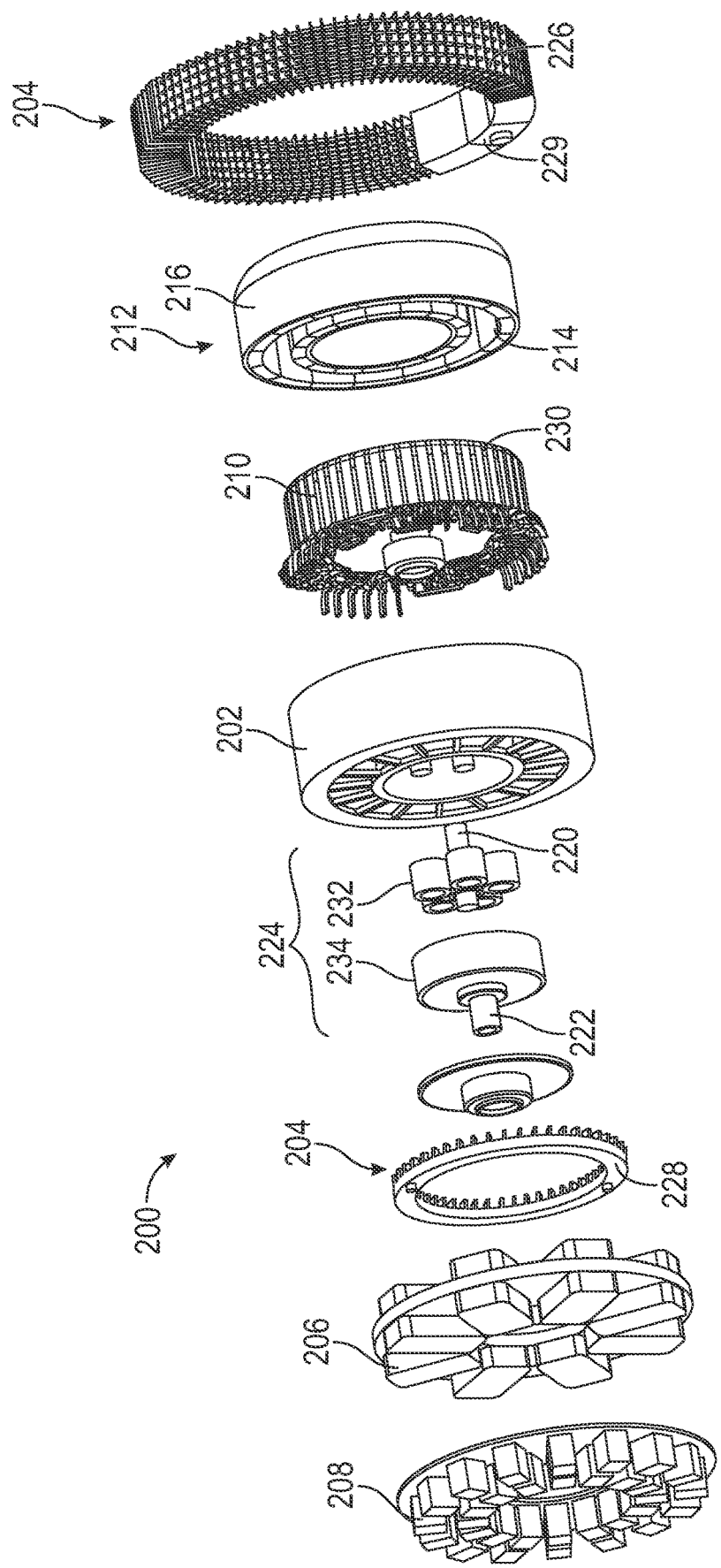
FIG. 2D is a separated-component illustration of the aircraft electric motor of FIG. 2A.

Turning now to FIGS. 2A-2D, schematic illustrations of an aircraft electric motor 200 in accordance with an embodiment of the present disclosure are shown. FIG. 2A is an isometric illustration of the aircraft electric motor 200, FIG. 2B is a side elevation view of the aircraft electric motor 200, FIG. 2C is a partial cut-away view illustrating internal components of the aircraft electric motor 200, and FIG. 2D is a schematic illustration of components of the aircraft electric motor 200 as separated from each other. The aircraft electric motor 200 includes a motor housing 202, a cooling system 204, a first power module system 206, and a second power module system 208.

The motor housing 202 houses a stator 210 and a rotor 212, with the rotor 212 configured to be rotatable about the stator 210. In this illustrative embodiment, the rotor 212 includes a U-shaped magnet 214 arranged within a similarly shaped U-shaped rotor sleeve 216. The rotor sleeve 216 is operably connected to a hub 218. The hub 218 is fixedly attached to a first shaft 220. The first shaft 220 is operably connected to a second shaft 222. In some configurations, the first shaft 220 may be a high speed shaft and may be referred to as an input shaft. In such configurations, the second shaft 222 may be a low speed shaft and may be referred to as an output shaft. The connection between the first shaft 220 and the second shaft 222 may be by a gear assembly 224, as described herein.

The cooling system 204 is configured to provide cooling to the components of the aircraft electric motor 200. The cooling system 204, as shown in FIG. 2D, includes a heat exchanger 226 and a header 228. The heat exchanger 226 and the header 228 may form a closed-loop cooling system that may provide air-cooling to a working fluid at the heat exchanger 226. The header 228 may be, in some configurations, a two-phase di-electric cooling header. A cooled working fluid may be pumped from the heat exchanger 226 into the header 228 using a pump 229 and distributed into embedded cooling channels 230 that are arranged within the stator 210. As the aircraft electric motor 200 is operated, heat is generated and picked up by the working fluid within the embedded cooling channels 230. This heated working fluid is then passed through the header 228 back to the heat exchanger 226 to be cooled, such as by air cooling. Although described as air-cooling, other cooling processes may be employed without departing from the scope of the present disclosure.

As shown, the heat exchanger 226 of the cooling system 204 may be a circular or annular structure that is arranged about the motor housing 202. This configuration and arrangement allows for improved compactness of the system, which may be advantageous for aircraft applications. The rotor sleeve 216 with the magnets 214, the stator 210, and the gear assembly 224 fit together (although moveable relative to each other) within the motor housing 202, providing for a compact (low volume/size) design.

As noted above, the rotor sleeve 216 may be operably coupled to a first shaft 220 by the hub 218. The first shaft 220 may be operably coupled to a first gear element 232 and the second shaft 222 may be operably coupled to a second gear element 234. The first and second gear elements 232, 234 may form the gear assembly 224. The first and second gear elements 232, 234 are arranged to transfer rotational movement from the first shaft 220, which is driven in rotation by the hub 218 and the rotor sleeve 216 of the rotor 212, to the second shaft 222. In some embodiments, the first shaft 220 may be operably coupled to a sun gear as the first gear element 232 that engages with a plurality of planetary gears and drives rotation of the second gear element 234 which may be operably connected to the second shaft 222. In some embodiments, the second shaft 222 may be connected to a fan or other component to be rotated by the aircraft electric motor 200.

The aircraft electric motor 200 includes the first power module system 206 and the second power module system 208. The first and second power module systems 206, 208 can include capacitors and other electronics, including, but not limited to, printed circuit boards (PCBs) that are configured to control and operate the aircraft electric motor 200. Again, the profile of the aircraft electric motor 200 of the present disclosure presents a low profile or compact arrangement that reduces the volume of the entire power system, which in turn can provide for improved weight reductions. In some embodiments, the first and second power module systems 206, 208 may be electrically connected to the stator 210 to cause an electric current therein. As the electric current will induce an electromagnetic field which will cause the rotor 212 to rotate.

Figure 3A:
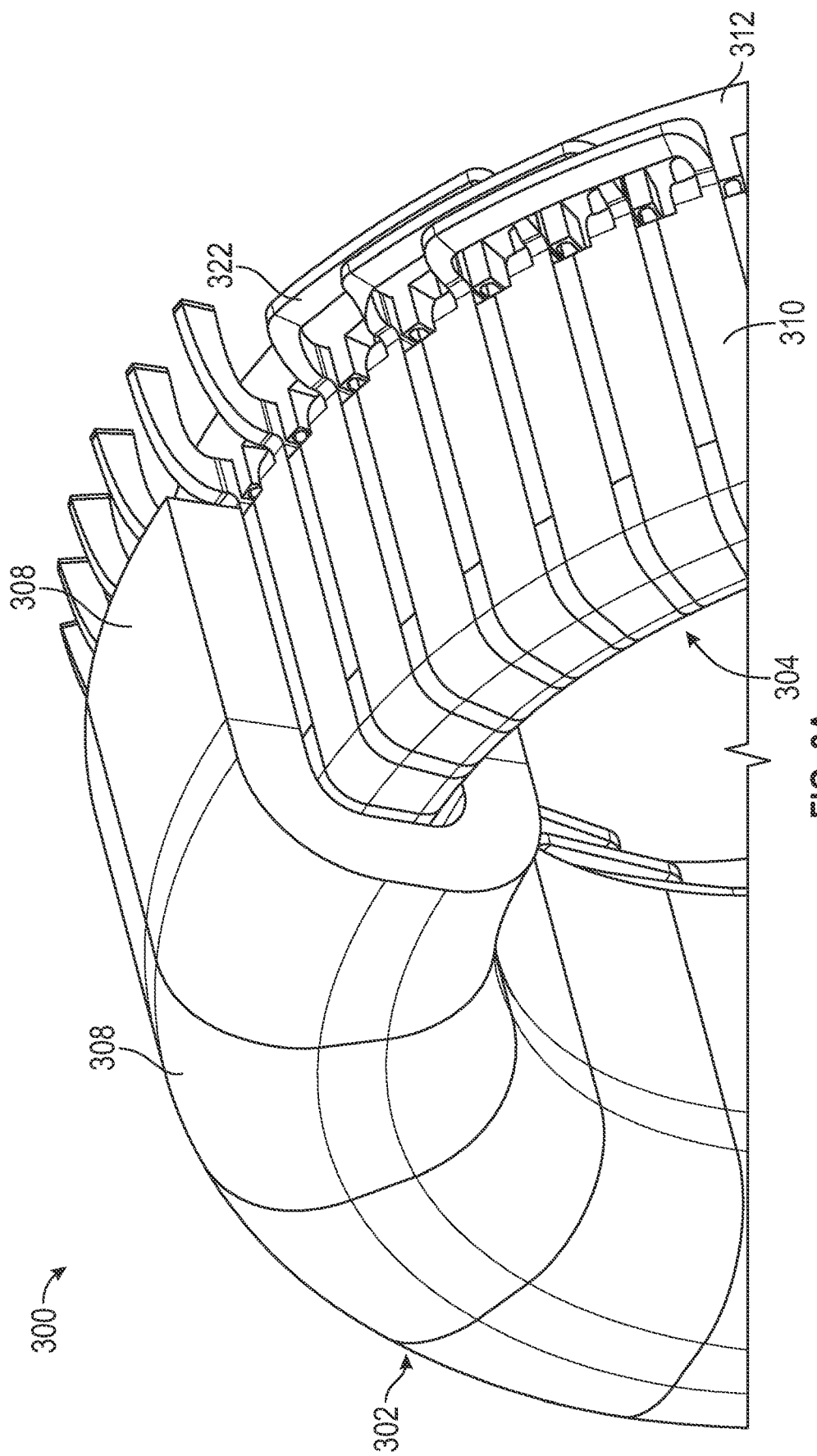
FIG. 3A is a schematic illustration of a rotor and stator of an aircraft electric motor in accordance with an embodiment of the present disclosure.
Figure 3B:
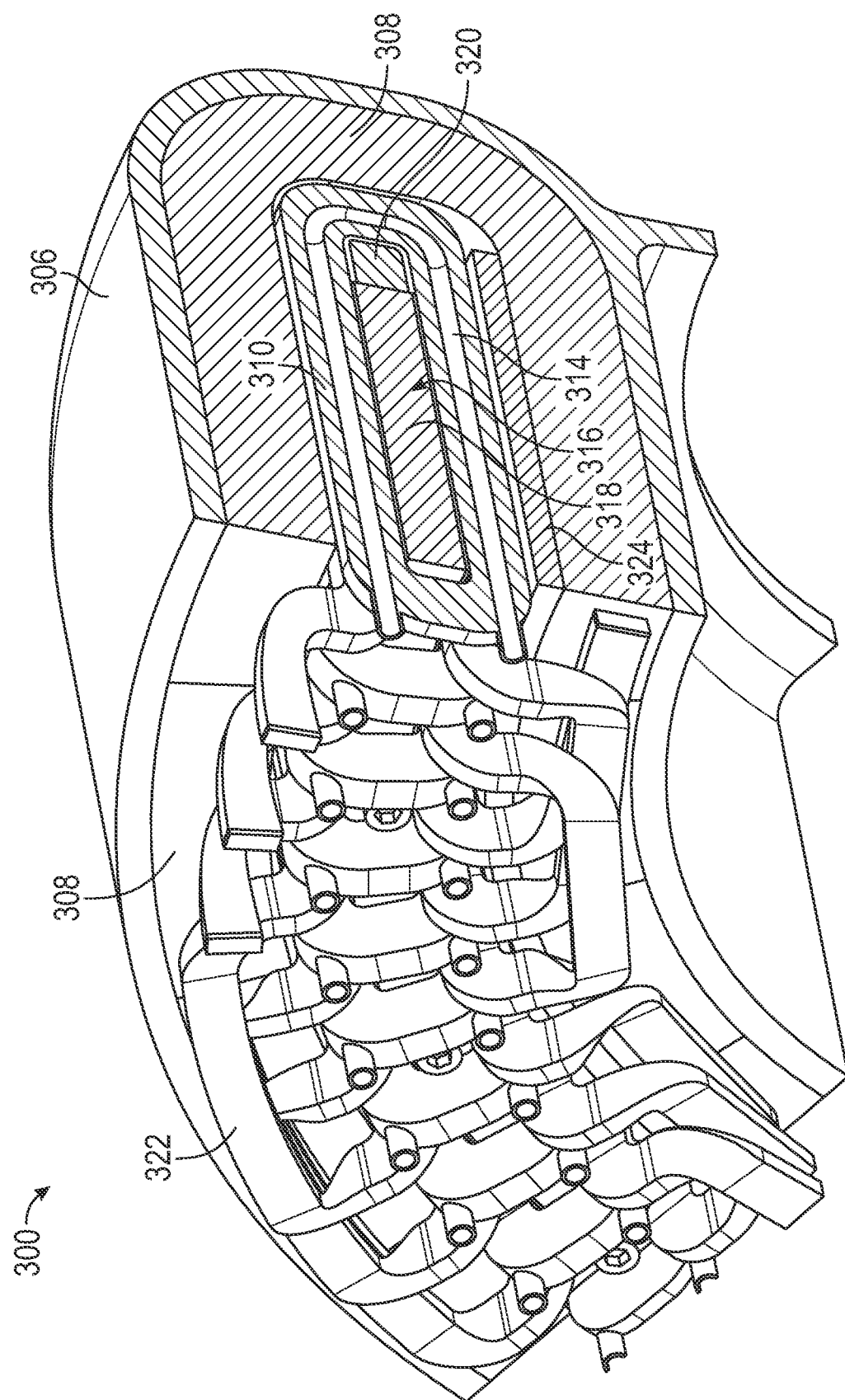
FIG. 3B is a schematic illustration of the rotor and stator of FIG. 3A as arranged within a rotor sleeve in accordance with an embodiment of the present disclosure.

Referring now to FIGS. 3A-3B, schematic illustrations of a portion of an aircraft electric motor 300 in accordance with an embodiment of the present disclosure is shown. FIGS. 3A-3B illustrate a portion of a rotor 302 and a stator 304 of the aircraft electric motor 300. FIG. 3A illustrates the rotor 302 and the stator 304 and FIG. 3B illustrates these components arranged within a rotor sleeve 306.

The rotor 302 is formed of a plurality of U-shaped magnets 308. In some configurations, the plurality of magnets 308 can be arranged with alternating polarity in a circular structure. Arranged within the "U" of the U-shaped magnets 308 is the stator 304. The stator 304 is formed of a plurality of windings 310. In this configuration, the windings 310 are arranged with a header 312. The header 312 may be part of a cooling system, such as that shown and described above. The header 312 can be configured to cycle a working fluid through cooling channels 314 for cooling of the windings 310, as shown in FIG. 3B.

The windings 310 may be wrapped about a support structure 316 (e.g., back iron or yoke). The support structure 316, in some embodiments and as shown in FIG. 3B, may include a laminate portion 318 and a magnetic portion 320.

In some such embodiments, the laminate portion 318 may be formed from cobalt steel laminate and the magnetic portion 320 may be formed from a soft magnetic composite. The laminate portion 318 may be provided to capture in-plane flux from outer and inner rotor. The magnetic portion 320 may be provided to capture end rotor flux and may take a shape/filler in a gap through the end turns of the coil. The windings 310 include end connections 322 and may be electrically connected to one or more power module systems of the aircraft electric motor, such as shown above.

As shown in FIG. 3B, the magnets 308 are U-shaped and arranged within the rotor sleeve 306. The rotor sleeve 306 is a substantially U-shaped sleeve that is sized and shaped to receive the U-shaped magnets 308. In this illustrative configuration, the rotor sleeve 306 can include an inner sleeve 324. The inner sleeve 324 may be configured to provide support to a portion of the magnets 308. It will be appreciated that there is no direct contact between the windings 310 and the magnets 308. This lack of contact allows for free rotation of the rotor 302 relative to the stator 304 during operation.

In aviation-class electric motors, such as shown and described above, a high-power density can be achieved by maximizing torque at a given speed. The torque density can be increased by improving utilization of magnetic materials and increase magnetic loading. Prior concepts for maximizing power density was achieved through minimizing the core of the rotor system. However, such minimization has an impact on magnetic loading (average airgap flux density). Conventionally, introducing a magnetic tooth can increase magnetic loading but may also increase torque ripple. Torque ripple is an effect seen in electric motor designs and refers to a periodic increase or decrease in output torque as the motor shaft rotates. Accordingly, it is desirable to both maximize magnetic loading while minimizing torque ripple. In view of this, embodiments of the present disclosure are directed to incorporating non-magnetic teeth and/or non-magnetic back iron, yoke, or support structure within the motor assembly. The non-magnetic structures (teeth and/or support structure) are made from non-magnetic materials (e.g., potting material, ceramic, etc.) may be infused or embedded with magnetic wires In accordance with embodiments of the present disclosure, the introduction of magnetic wire-infused teeth and/or support structures results in reduced weight and improved power density. Further, advantageously, such configurations can provide a low weight solution without sacrificing average torque of the motor. Shaping of the wires near an airgap (e.g., to the magnets of the motor) can also help manipulate the harmonics in the airgap and result in redistribution of torque ripple harmonics and reduce torque ripple without impacting average torque.

Figure 4A:
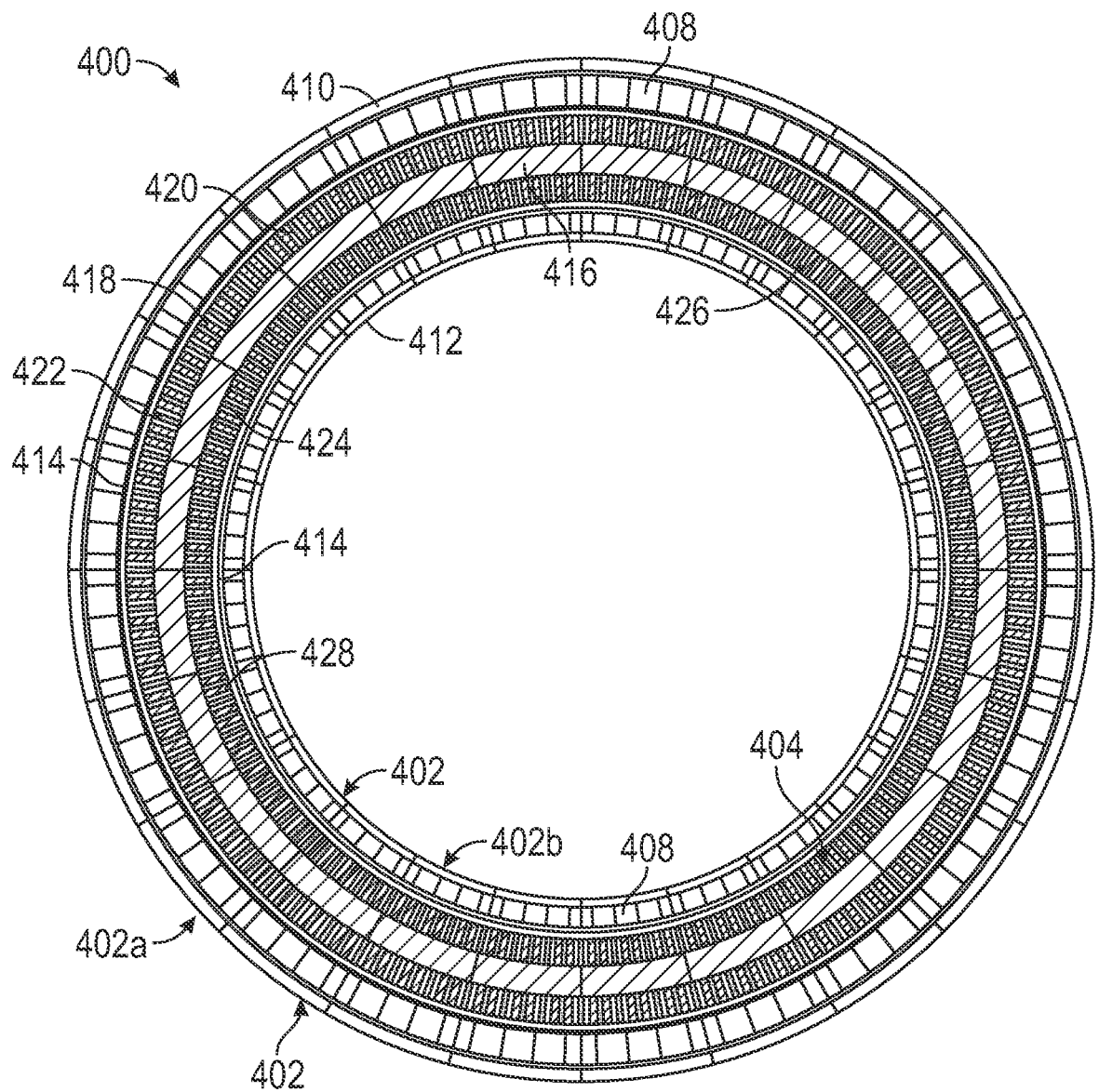
FIG. 4A is a schematic illustration of a radial cross-section of an aircraft electric motor in accordance with an embodiment of the present disclosure.
Figure 4B:
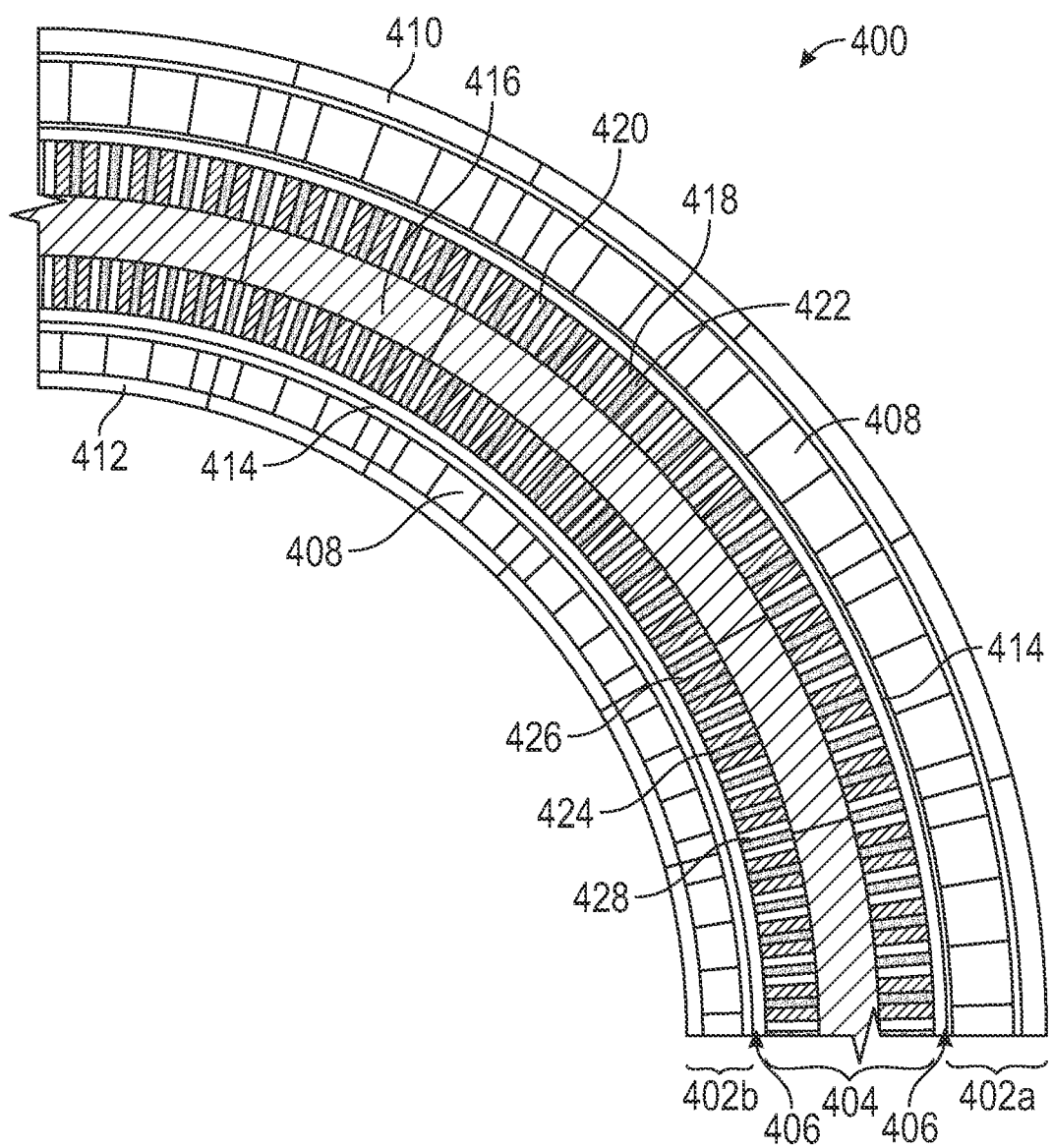
FIG. 4B is an enlarged illustration of a portion of the structure shown in FIG. 4A.

Referring to FIGS. 4A-4B, schematic illustrations of a portion of an aircraft electric motor 400 in accordance with an embodiment of the present disclosure is shown. FIGS. 4A-4B illustrate a portion of a rotor 402 and a stator 404 of the aircraft electric motor 400. FIG. 4A illustrates the full circular structure of the rotor 402 and the stator 404 and FIG. 4B illustrates an enlarged illustration of a portion of the rotor 402 and the stator 404. The rotor 402 and the stator 404 may be part of an aircraft electric motor similar to that shown and described herein and used as described herein.

As shown, the rotor 402 is arranged about the stator 404, with an outer portion 402a and an inner portion 402b arranged radially outward and inward from the stator 404, respectively. The outer and inner portions 402a, 402b may be parts of a substantially U-shaped magnet assembly, as shown and described above. The stator 404 is arranged between the outer and inner portions 402a, 402b with an airgap 406 therebetween, as shown in FIG. 4B. The rotor 404 includes a plurality of magnets 408, which may be substantially U-shaped and span from the outer portion 402a to the inner portion 402b. An outer rotor sleeve 410 and an inner rotor sleeve 412 may be separate components or a continuous structure, as shown and described above, and are configured to support and retain the magnets 408 of the rotor 402. Further, one or more retention sleeves 414 may be arranged on a side of the magnets 408 that faces the stator 404. The rotor 402 is configured to be rotationally driven by current that is passed through the stator 404.

In some configurations, the stator 404 may include a support structure 416 (e.g., a back iron or yoke). The support structure 416 may be configured to support, on a radial outer side thereof, a plurality of outer teeth 418, outer coils 420, and outer cooling channels 422. Similarly, on a radially inner side of the support structure 416 are arranged a plurality of inner teeth 424, inner coils 426, and inner cooling channels 428. It will be appreciated that, in accordance with some embodiments, the support structure 416 may be omitted and the structural aspects thereof provided by other features, as shown and described herein.

In some embodiments of the present disclosure, one or more of the outer teeth 418, the inner teeth 424, and/or the support structure 416 may be made of a non-magnetic material with embedded magnetic wires. In some example embodiments, each of the outer teeth 418 the inner teeth 424, and/or the support structure 416 may be formed of a non-magnetic material with embedded magnetic wires and shaped to reduce torque ripple while increasing magnetic loading and improving manufacturability and address stack-up tolerance challenges.

As shown in FIG. 4A, the rotor 402 and stator 404 form a substantially ring-shape or annular shape. As shown, the outer teeth 418 and the inner teeth 424 are each arranged in a circumferential arrangement and extend radially from the support structure 416. The outer teeth 418 extend radially outward from the support structure 416 and the inner teeth 424 extend radially inward from the support structure 416. In some configurations, the teeth 418, 424 may be the same in shape, orientation, material, and the like about the circumferences of the stator 404. In other embodiments, the teeth 418, 424 may be arranged in sets or specific configurations arranged in a repeating pattern about the respective circumferential arrangement.

In Aviation-class electric motors, a high-power density can be achieved though maximizing torque at given operational speeds. The torque density can be increased by improving utilization of magnetic materials and increased magnetic loading. Although improvements have been made to individual sub-component to provide specific functionality such modifications have added additional weight and may have detrimental impacts on the power/torque density of the electric motor.

Conventional motor-stator systems that include a motor housing adds additional weight and may result in a detrimental impact on power density. Improved housing/support structures that eliminate weight and provide other benefits may be advantageous. For example, embodiments of the present disclosure are directed to cooling channel configurations of electric motors that provide for multiple functions. For example, in accordance with some embodiments of the present disclosure, the cooling system includes cooling channel structures that provide a cantilever support to the stator. For example, cooling plates may be arranged to extend from a manifold, with the cooling plates each including one or more cooling channels fluidly connecting to the manifold (e.g., between an inlet manifold and an outlet manifold). The cooling plates may be arranged with the manifold to form a structural body to which coils and magnetic teeth may be attached (e.g., by an adhesive, epoxy, fastener, or the like). Advantageously, embodiments of the present disclosure provide for a housing-less motor architecture. The cooling system (e.g., cooling plates extending from a manifold), may provide various functionality, including, without limitation, supplying coolant into stator sub-components (e.g., coils, tooth, back iron, etc.) while also providing structural support to the cantilever nature of the stator.

Figure 5A:
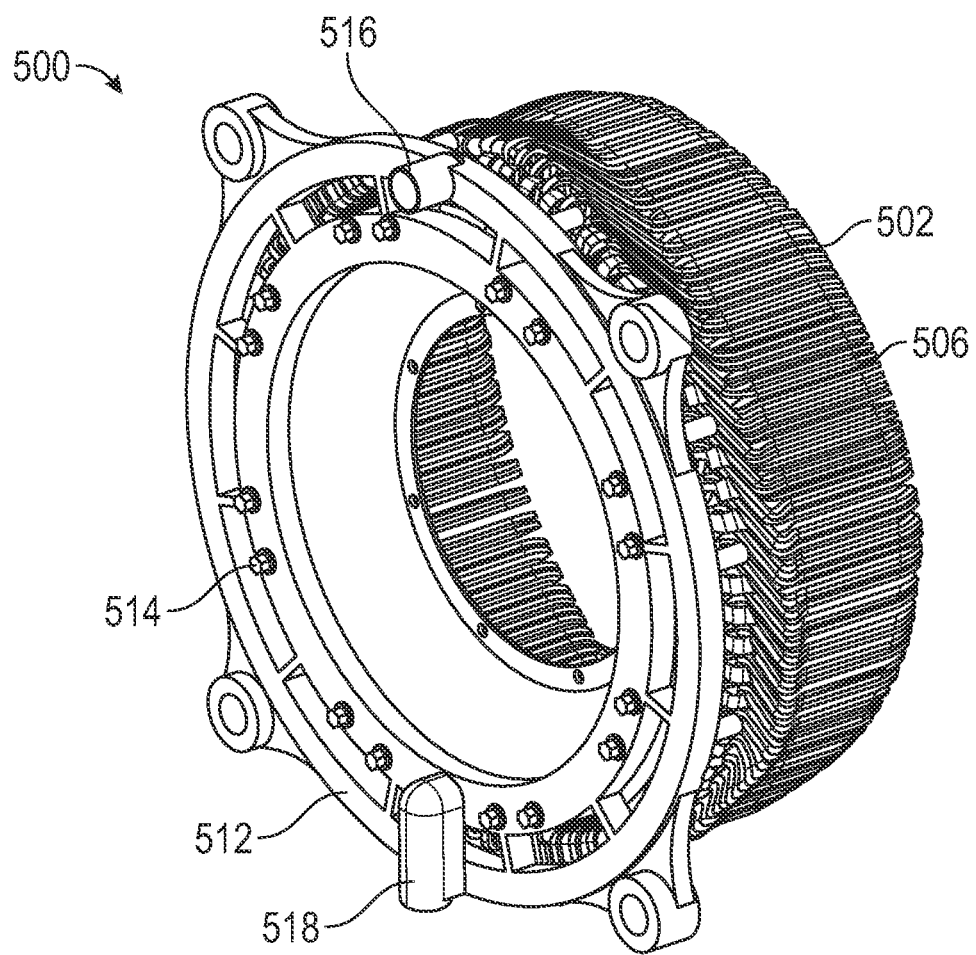
FIG. 5A is a schematic illustration of a stator of an electric motor in accordance with an embodiment of the present disclosure.
Figure 5B:
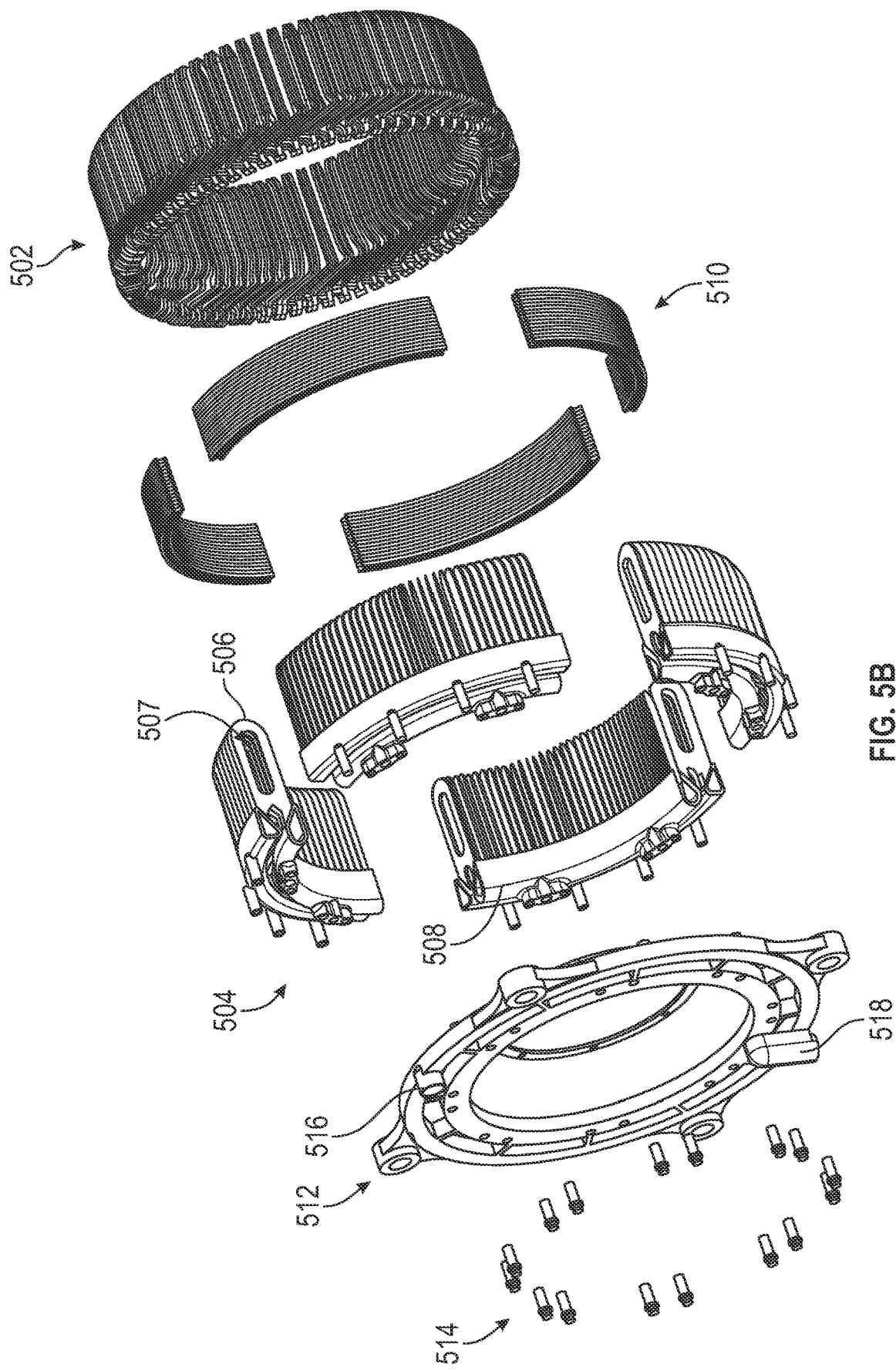
FIG. 5B is an illustration of the components of the stator of FIG. 5A separated apart from each other.

Referring now to FIGS. 5A-5B, schematic illustrations of a stator 500 in accordance with an embodiment of the present disclosure are shown. FIG. 5A illustrates the stator 500 as assembled and FIG. 5B illustrates components of the stator 500 as separated or disassembled. The stator 500 may be used in electric motors, as shown and described herein. The stator 500 is configured as a circular or annular stator that may be arranged with a moving rotor (e.g., magnets) that may be rotationally driven by current passed through the stator 500.

As shown in FIG. 5B, the stator 500 includes stator windings or coils 502 that may be supported on a cooling assembly 504. The cooling assembly 504 includes a plurality of cooling plates 506 that extend from a support manifold 508. A core 510 may be arranged to pass through the cooling plates 506 and the coils 502. The core (e.g., a back iron or laminates) may be provided to convey or direct the magnetic flux from the coils to the rotor magnets through the magnetic teeth. To accommodate the core 510, the cooling plates 506 may have a through hole, aperture, or opening 507 for accommodating the core 510 and the coils may be wrapped about the core 510 to form the windings thereof. The installation or winding process results in the coils 502 being arranged in an alternating pattern with the cooling plates 506 such that each cooling plate 506 can provide cooling to two coils, with one coil on one side and the other coil on the other side of the cooling plate. The cooling plates 506 extend from the support manifold 508 and thus have a fixed end that attaches to the support manifold 508 and a free end that is opposite from the support manifold 508. The cooling plates 506 are arranged as loops or circuits for passing a cooling fluid therethrough. The core 510 does not provide structural support to the cooling plates 506, coils 502, and/or magnetic teeth installed therewith. Rather, the structural support of the stator 500 is provided through a cantilever configuration, as described herein.

The cooling assembly 504 may be fixed to a support frame 512 by one or more fasteners 514. The support frame 512 is configured to structurally support the cooling assembly 504 and the coils 502 to form the stator 500. The support frame 512 may be a structure that is fixed to a structural ground (e.g., case or other structure) to support the stator 500 within an electric motor. The support frame 512 includes a fluid inlet 516 and a fluid outlet 518. The fluid inlet 516 is configured to fluidly connected to an internal channel or cavity of the support manifold 508 (e.g., inlet manifold) and thus supply a cooling fluid into the support manifold 508. The cooling fluid will then pass through the cooling plates 506 and the fluid will enter another cavity or internal channel of the support manifold 508 (e.g., outlet manifold). The fluid outlet 518 of the support frame 512 is configured to receive a fluid output from the cooling plates 506.

Figure 6A:
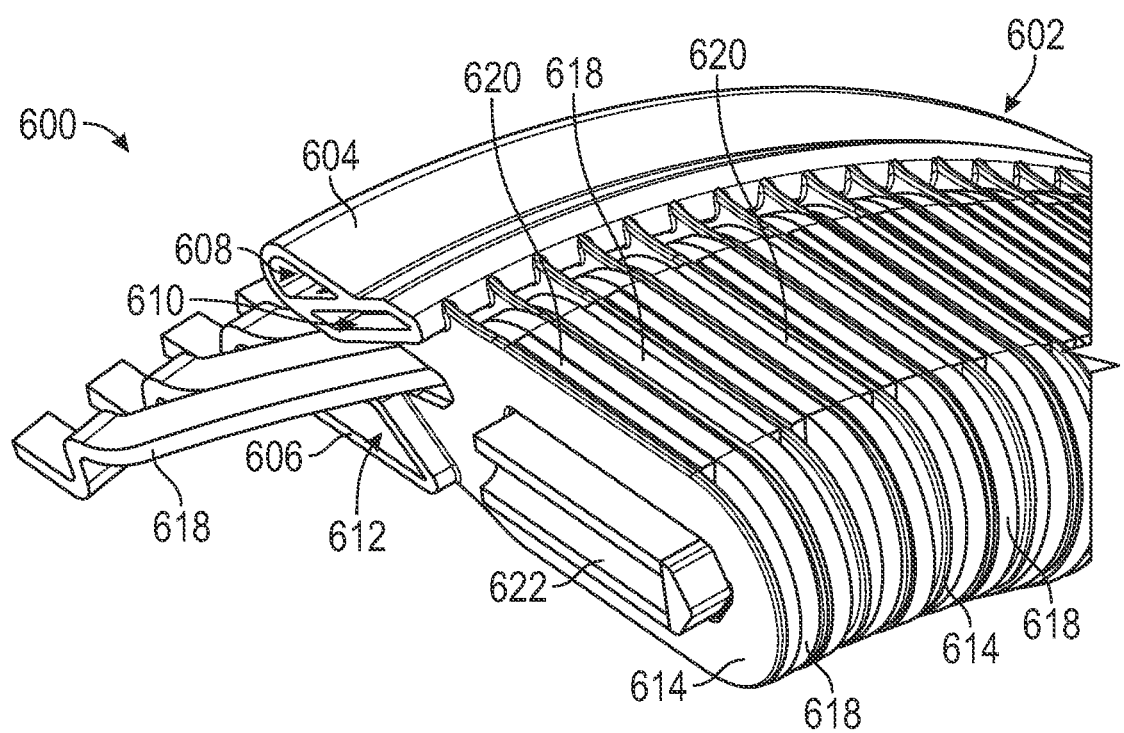
FIG. 6A is a schematic illustration of a cantilever structure of a portion of a stator of an electric motor in accordance with an embodiment of the present disclosure.
Figure 6B:
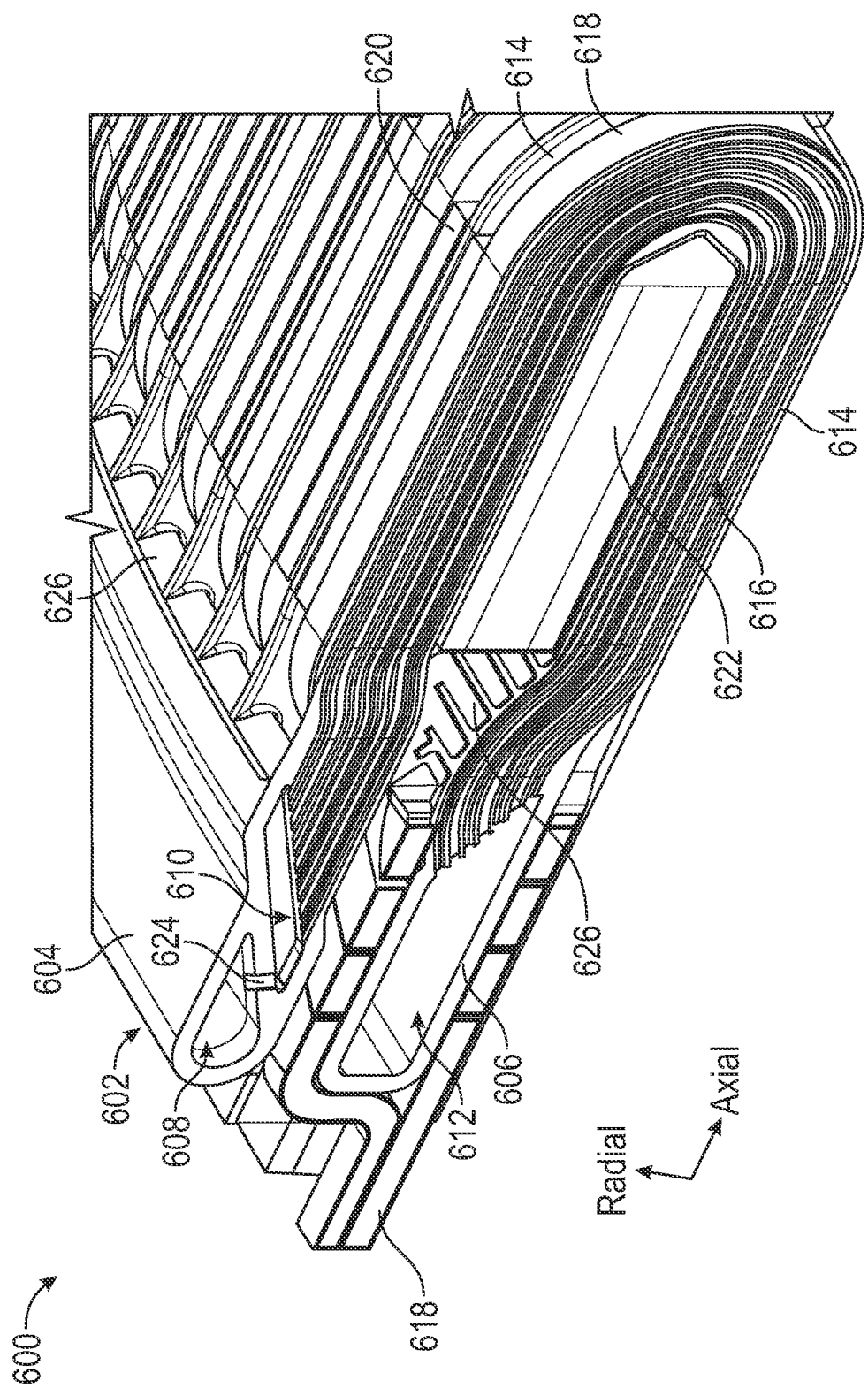
FIG. 6B illustrates a partial cross-sectional illustration of a portion of the cantilever structure of FIG. 6A.

Referring now to FIGS. 6A-6B, schematic illustrations of a portion of a stator 600 in accordance with an embodiment of the present disclosure are shown. The stator 600 is a cantilever supported structure. That is, the stator 600 is configured to be structurally supported on one side, with the structural support of coils/windings of the stator 600 being provided, in part, by the cooling system of the stator 600. The stator 600 may be configured similar to that shown and described above and may be incorporated into an electric motor or machine, such as for use onboard an aircraft.

The stator 600 includes a cantilever structure 602 that is configured to provide both cooling functionality and structural support functionality to the stator 600. The cantilever structure 602 includes an inlet support manifold 604 and an outlet support manifold 606. In this illustrative configuration, the inlet support manifold 604 defines or includes a first inlet cavity 608 and a second inlet cavity 610. The outlet support manifold defines or includes an outlet cavity 612. The inlet support manifold 604 and the outlet support manifold 606 are connected by one or more cooling plates 614. The cooling plates 614 define internal cooling channels 616 that fluidly connect the inlet cavities 608, 610 to the outlet cavity 612.

As shown in FIG. 6B, the inlet support manifold 604 is arranged radially outward from the outlet support manifold 606. Further, the inlet support manifold 604 and the outlet support manifold 606 are aligned in an axial direction, such that the inlet support manifold 604 is arranged at the same axial position but at a different radial position than the outlet support manifold 606. The cooling plates 614 extend axially from the axial location of the inlet support manifold 604 and the outlet support manifold 606. As such, the radial extent or span of the cooling plates 614 is between the radial position of the inlet support manifold 604 and the outlet support manifold 606. Each cooling channel 616 defines a fluid path from the second inlet cavity 610 to the outlet cavity 612 that passes through the respective cooling plates 614.

Each cooling plate 614 is a flat or plate-like structure with the cooling channels 616 formed therein. The cooling plates 614 are arranged in a series with a space or gap between each cooling plate 614 and an adjacent cooling plate 614. In the space between two adjacent cooling plates 614, the stator 600 includes at least one winding 618 and at least one magnetic tooth 620. The windings 618 may be coils of wire that are wrapped about a core 622, such as a back iron, laminate, or core. The core 622 is configured to pass through, in part, the windings 618, the magnetic teeth 620, and the cooling plates 614.

In operation, the first inlet cavity 608 will receive a cooling fluid, such as a liquid coolant. The cooling fluid will fill the first inlet cavity 608 and enter the second inlet cavity 610 through one or more metering apertures 624. The metering apertures 624 are arranged to meter and control flow of the cooling fluid into the second inlet cavity 610 and to ensure even distribution of the cooling fluid through the stator 600. The cooling fluid will then enter and flow through the cooling channels 616 of the cooling plates 614. As the cooling fluid passes through the cooling channels 616, the cooling fluid will pick up heat from, at least, the windings 618. The heat pickup may result in a phase change of the cooling fluid. The heated cooling fluid will then exit the cooling channels 616 and enter the outlet cavity 612 of the outlet manifold 606. As illustrated, the outlet cavity 612 has a greater volume than either the first inlet cavity 608 or the second inlet cavity 610. This is because the cooling fluid may enter the inlet cavities 608, 610 as a liquid and then as the cooling fluid picks up heat, it will expand and potentially phase change to a vapor or gaseous state, which has a greater volume, and thus the outlet cavity 612 is sized to receive such increased volume cooling fluid. The windings 618, the magnetic teeth 620, and the cooling plates 614 may be bonded together using structural putty or other binding material.

The cantilever structure 602 of the stator 600 provides a rigid structural element defined by the inlet support manifold 604 and the outlet support manifold 606. The cooling plates 614 extend or project from the rigid structural element defined by the inlet support manifold 604 and the outlet support manifold 606 and thus forms the cantilever structure 602. The combination of the cooling plates 614 and the core 622 provides support for the windings 618 and the magnetic teeth 620. When assembled, the components may be bonded together with bonding material 626, such as a putty, epoxy, thermoset, thermoplastic, polymer, or the like, and the assembled stator 600 will be arranged in a cantilever configuration, structurally supported at the end with the manifolds 604, 606.

Figure 7A:
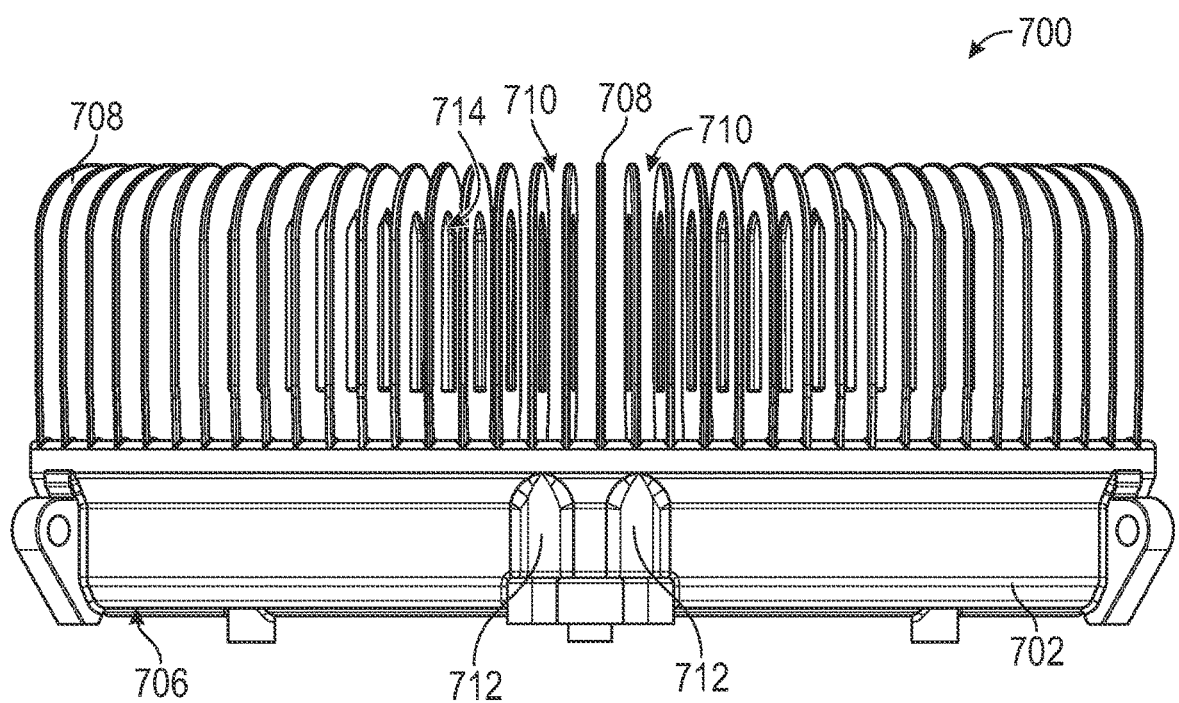
FIG. 7A is a schematic illustration of a cantilever structure of a portion of a stator of an electric motor in accordance with an embodiment of the present disclosure.
Figure 7B:
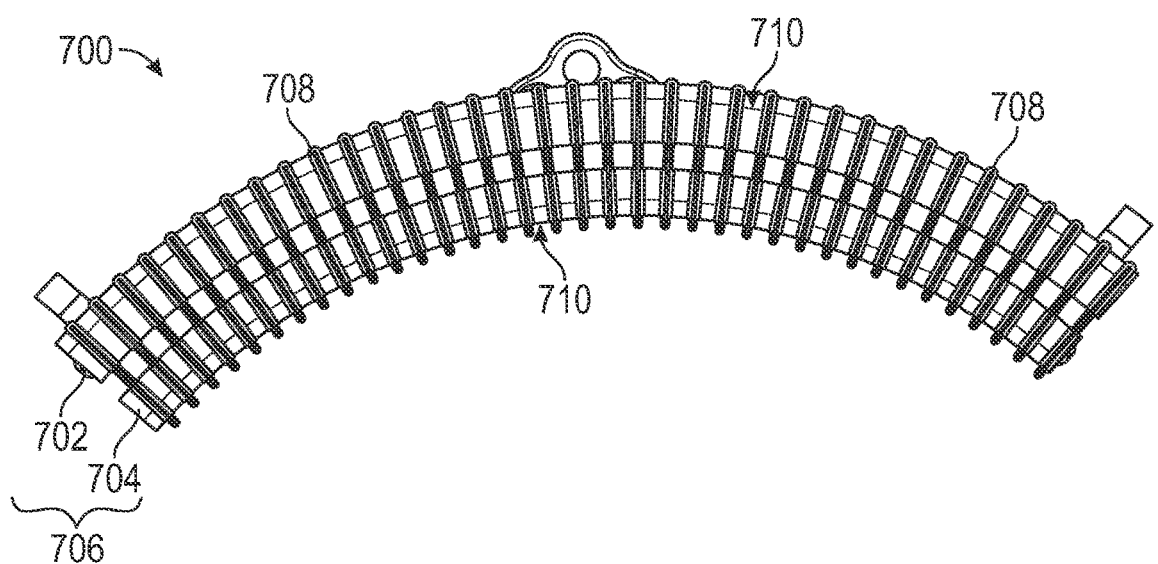
FIG. 7B is an alternative view of the cantilever structure of FIG. 7A.

Referring now to FIGS. 7A-7B, schematic illustrations of a cantilever structure 700 of a stator in accordance with an embodiment of the present disclosure are shown. The cantilever structure 700 of FIGS. 7A-7B may form a part of the stator for an electric motor or machine, such as for use onboard an aircraft. The cantilever structure 700 is configured to provide multiple functions to the stator. For example, the cantilever structure 700 is configured to provide a cooling functionality and a structural support functionality.

The cantilever structure 700 includes an inlet support manifold 702 and an outlet support manifold 704 which collectively define a supported end 706 of the cantilever structure 700. The supported end 706, in accordance with some embodiments of the present disclosure, is arranged as a ring or annular structure, with the inlet support manifold 702 being arranged radially outward from the outlet support manifold 704. Extending from the annular structure of the supported end 706 are a plurality of cooling plates 708. The cooling plates 708 are arranged as cantilever beams or the like that extend in an axial direction relative to the annular structure of the supported end 706. As such, when force is applied to the cooling plates 708, the force will be transferred to the supported end 706. That is, when the cooling plates 708 are subjected to a structural load (e.g., at the unsupported end), the cantilever carries the load to the supported end 706 where it may apply a shear stress and a bending moment.

The cooling plates 708 are arranged in a pattern with gaps 710 defined between adjacent cooling plates 708. The gaps 710 are configured to receive windings and/or magnetic teeth of the stator. The cooling plates 708 are arranged such that when windings and/or magnetic teeth are positioned within the gaps 710, the windings and/or magnetic teeth will be arranged in thermal contact with the cooling plates 708 such that heat may be withdrawn from the windings and/or magnetic teeth to provide cooling thereto. As shown in FIG. 7A, the support end 706, and specifically the inlet support manifold 702, includes one or more fluid inlets 712 configured to supply a cooling fluid into the inlet support manifold 702. It will be appreciated that the outlet support manifold 704 may include a fluid outlet, such as shown and described above.

FIG. 7A also illustrates an opening 714 defined within each cooling plate 708. The opening 714 is sized and shaped to receive a core, such as a back iron, laminate, or the like. The opening 714 is defined, in part, by the flow path of a cooling fluid through the cooling plates 708. The cooling plates 708 define a loop type structure with a flow path extending in an axial direction along a radial outward portion of the cooling plate 708 (e.g., radially outward from the opening 714). The flow path will then turn and extend radially inward along an end of the cooling plate 708 (e.g., at an end opposite the inlet manifold 702). The flow will then be directed axially along a radially inward portion of the cooling plate 708 (e.g., radially inward from the opening 714) and direct the fluid into the outlet manifold 704. The opening 714 is a portion of the cooling plates 708 that does not require cooling, and thus removing the material at the location of the opening 714 reduces the weight of the cooling plates 708 while also providing for a location to install the core (e.g., back iron, laminate, or the like).

Figure 8:
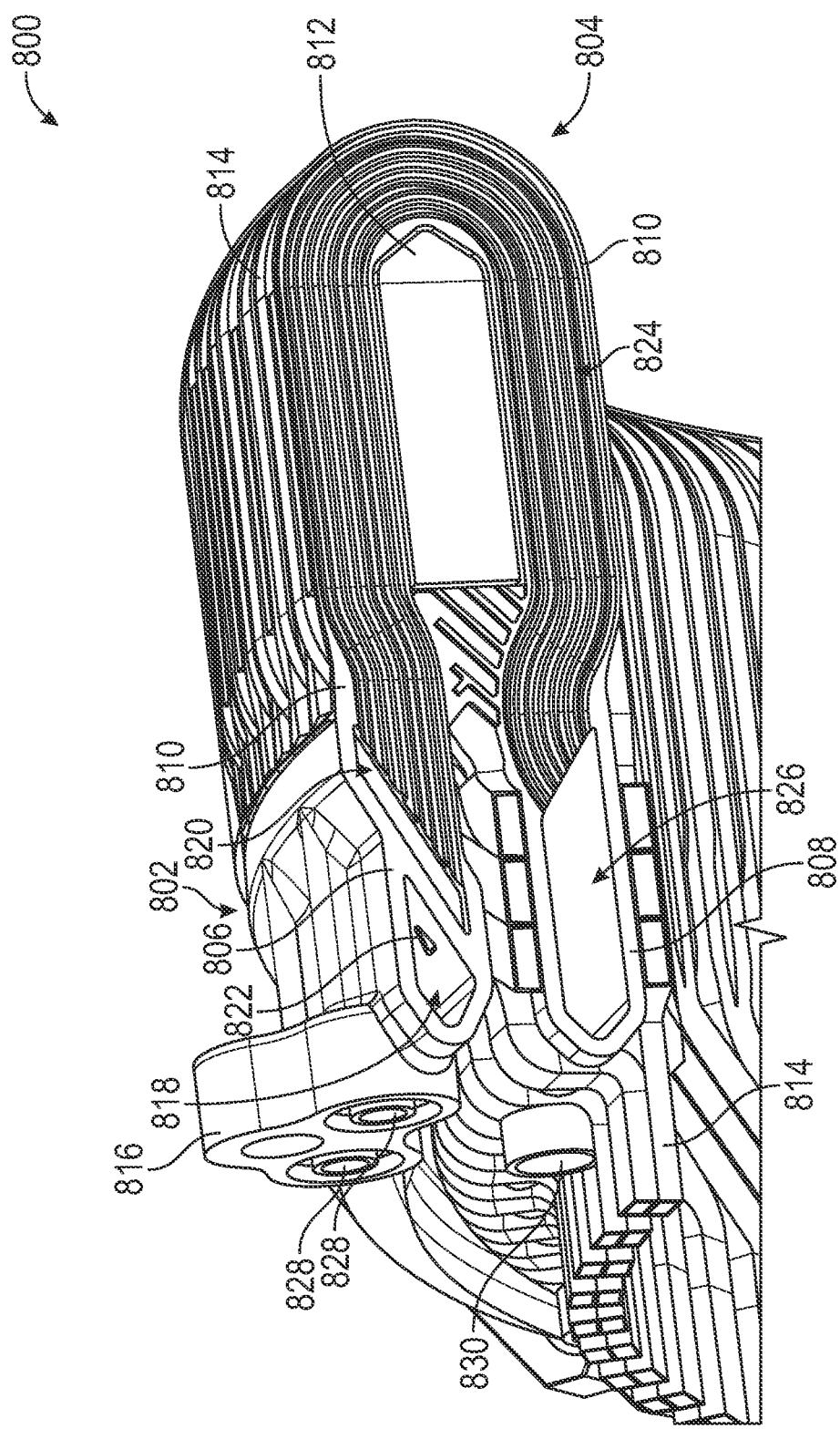
FIG. 8 is a schematic illustration of a cantilever structure of a portion of a stator of an electric motor in accordance with an embodiment of the present disclosure.

Referring now to FIG. 8, a schematic illustration of a cantilever structure 800 of a stator in accordance with an embodiment of the present disclosure are shown. The cantilever structure 800 of FIG. 8 may form a part of the stator for an electric motor or machine, such as for use onboard an aircraft. The cantilever structure 800 is configured to provide multiple functions to the stator. For example, the cantilever structure 800 is configured to provide a cooling functionality and a structural support functionality.

As shown, the cantilever structure 800 includes a supported end 802 and an unsupported end 804. The supported end 802 includes an inlet support manifold 806 and an outlet support manifold 808. The unsupported end 804 is defined by cooling plates 810 of the cantilever structure 800, with a core 812, such as a back iron, laminate, or core, and windings 814 installed with the cooling plates 810, as shown and described above. The core 812 may be an annular or ring shape (or segmented ring shape) that fits within an opening defined by each of the cooling plates 810. The windings 814 may be wrapped about the core 812 and supported between and by the cooling plates 810, and the windings 814 may be arranged in thermal contact with the cooling plates 810.

The inlet support manifold 806 includes one or more mounting structures 816 that are configured to fixedly attach the cantilever structure 800 to a case or other component of an electric motor (e.g., physical/structural grounding). The inlet support manifold 806 defines one or more inlet cavities. For example, in this illustrative embodiment, the inlet support manifold 806 includes and defines a first inlet cavity 818 and a second inlet cavity 820 that are fluidly connected by one or more metering apertures 822. The second inlet cavity 820 is configured to supply a cooling fluid into one or more cooling channels 824 that fluidly extend as channels from the second inlet cavity 820 to an outlet cavity 826 defined by the outlet support manifold 808.

As shown in FIG. 8, the first inlet cavity 818 of the inlet support manifold 806 may be supplied with fluid from one or more fluid inlets 828, such as from a system as shown and described with respect to FIGS. 2A-2D. In this configuration, the fluid inlets 828 are arranged within and through the mounting structure 816, although such location is not intended to be limiting. The cooling fluid is supplied into the cantilever structure 800 through the fluid inlets 828 and into the inlet manifold 806. Once the cooling fluid has passed through the cooling channels 824 of the cooling plates 810, the cooling fluid will enter the outlet cavity 826 of the outlet manifold 808. The cooling fluid, which may be a mixture of liquid and vapor, may be removed from the outlet cavity 826 through one or more fluid outlets 830.

Figure 9A:
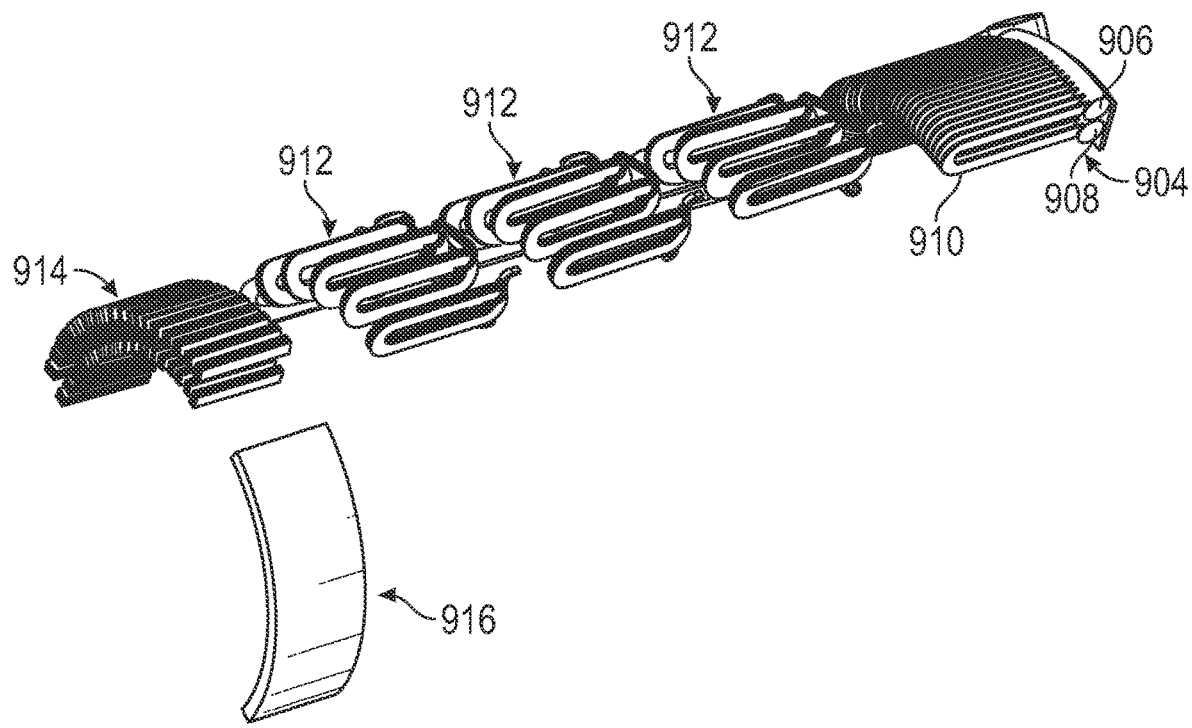
FIG. 9A is a schematic illustration of a step of an assembly process for assembling a stator of an electric motor in accordance with an embodiment of the present disclosure.
Figure 9B:
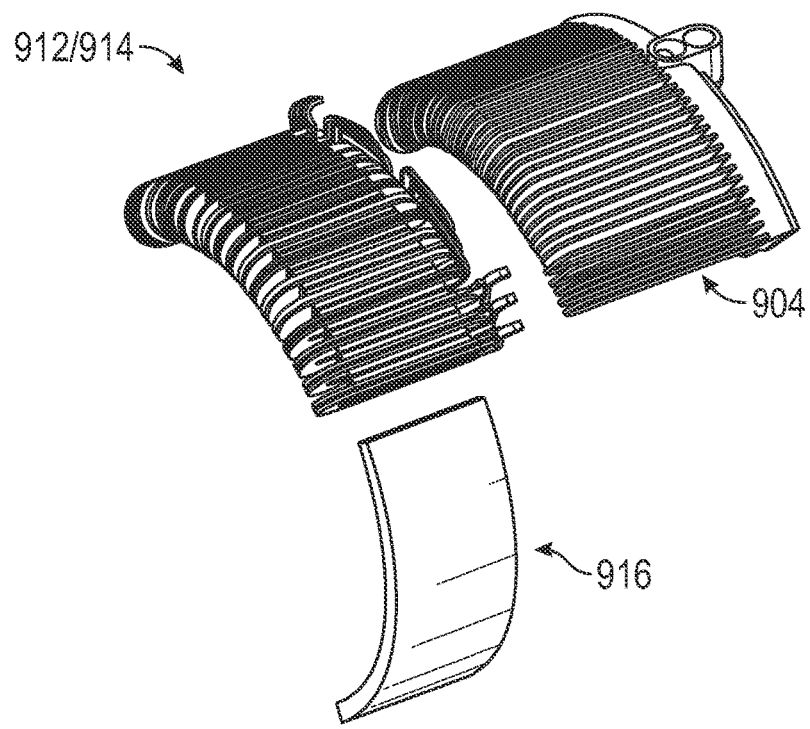
FIG. 9B illustrates another step of the assembly process of the stator of FIG. 9A.
Figure 9C:
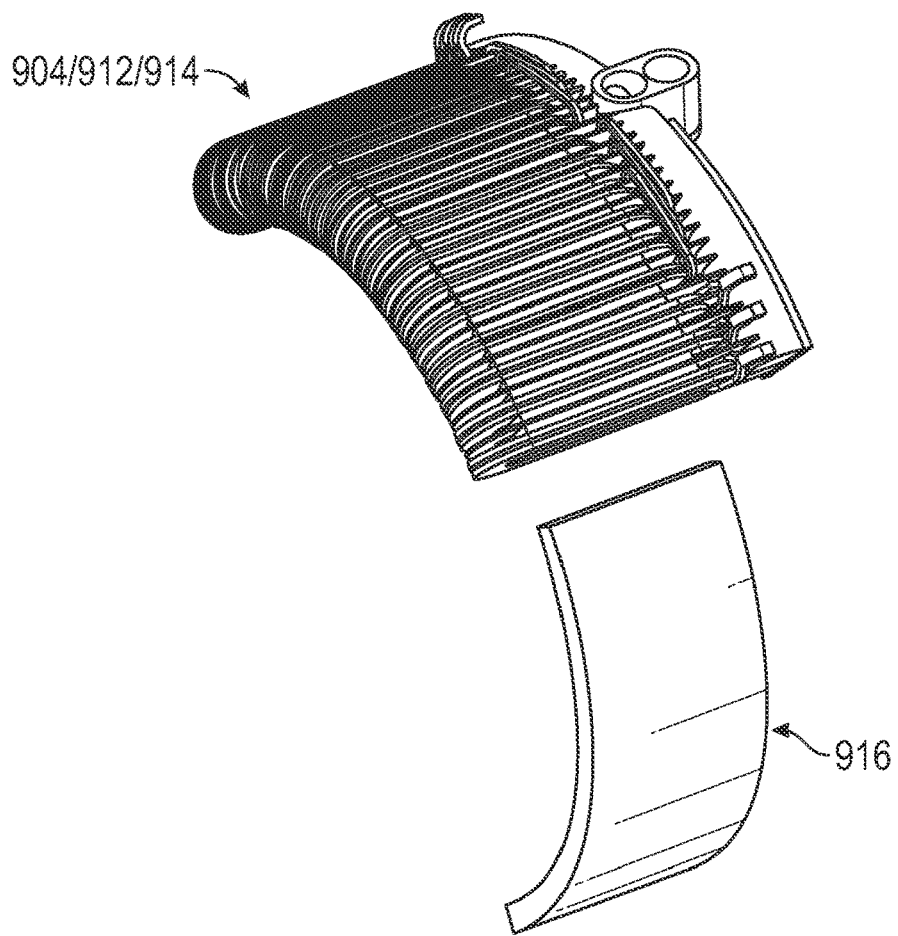
FIG. 9C illustrates another step of the assembly process of the stator of FIG. 9A.
Figure 9D:
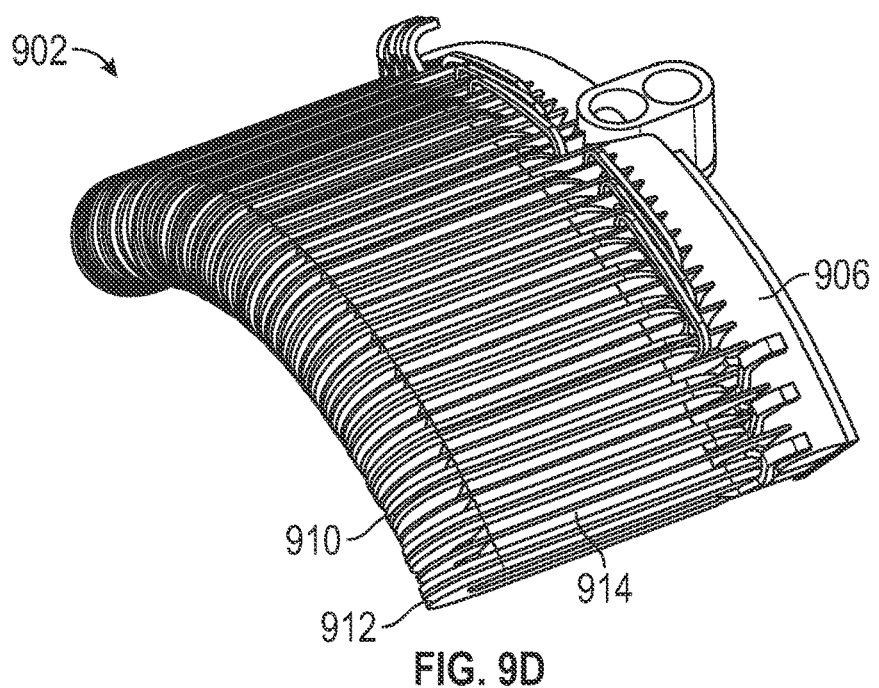
FIG. 9D illustrates another step of the assembly process of the stator of FIG. 9A.
Figure 9E:
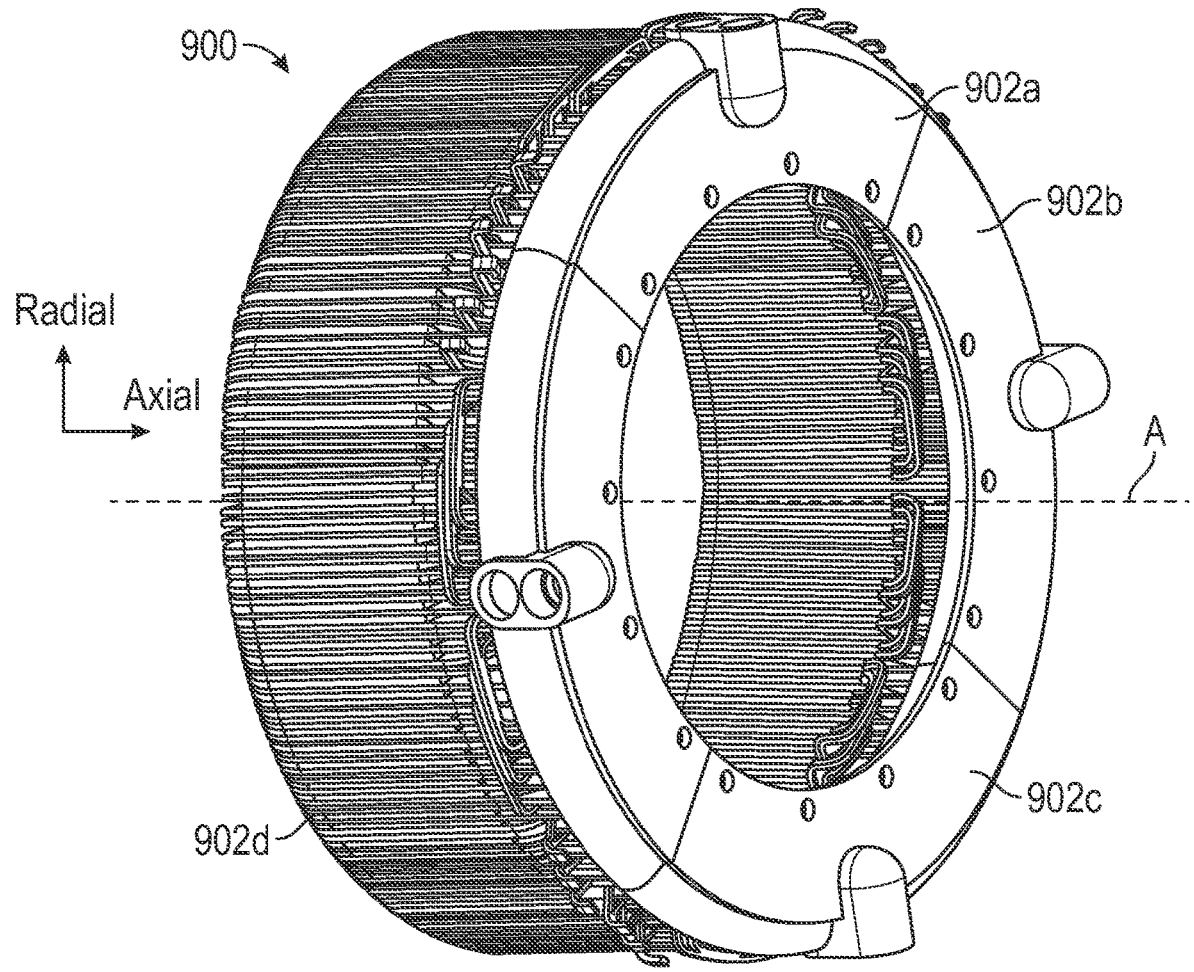
FIG. 9E illustrates the assembled stator from FIGS. 9A-9D.

Referring now to FIGS. 9A-9E, schematic illustrations of a process of assembling a stator 900 (shown in FIG. 9E) in accordance with an embodiment of the present disclosure are shown. As shown in FIG. 9E, the stator 900 is formed of four stator sections 902a, 902b, 902c, 902d (generally referred to as stator section 902). FIG. 9D illustrates an assembled stator section 902, with each stator section 902a, 902b, 902c, 902d illustrated in FIG. 9E having the same structural configuration as that of the stator section 902 shown in FIG. 9D. FIGS. 9A-9C illustrate the assembly process of the stator sections 902.

The stator sections 902 are composed of a cantilever structure 904 having a supported end and an unsupported end, similar to that shown and described above. The cantilever structure 904 has an inlet support manifold 906 and an outlet support manifold 908 at the supported end and cooling plates 910 extend from the inlet support manifold 906 and the outlet support manifold 908 and define an unsupported end at the distal ends of the cooling plates 910 (i.e., away from the inlet support manifold and the outlet support manifold at the supported end). The stator sections 902 also include a plurality of coils 912 (also referred to as windings), a plurality of magnetic teeth 914, and a core 916.

As shown in FIG. 9A, the components of the stator section 902 are separated and arranged to be assembled. In FIG. 9B, the magnetic teeth 914 and the coils 912 are stacked and arranged such that adjacent coils have one or more magnetic teeth 914 arranged therebetween. In FIG. 9C, the assembled coils 912 and magnetic teeth 914 are installed and arranged relative to the cantilever structure 904. The core 916 may then be inserted into holes, apertures, gaps, or spaces of the cooling plates 910, coils 912 and magnetic teeth 914, to form the stator section 902, as shown in FIG. 9D. The openings of the coils 912 and cooling plates 910 define a circle or annular space within the assembly prior to insertion of the core 916. Multiple stator sections 902 (e.g., stator sections 902a-d) may be assembled into a ring or annular structure to form the stator 900 having a cantilever configuration. The assembled stator 900 may then be installed into an electric motor, such as shown and described above.

As shown in FIG. 9E, the stator 900 has a ring shape or annular structure. The cantilever structure 904, when assembled, defines an annular shape and thus defines an axis A through a center of the annular shape. The coils 912, magnetic teeth 914, and core 916 are structurally supported by the cooling plates 910 which define a cantilever arm which is supported at one end (i.e., supported end defined by the inlet support manifold 906 and the outlet support manifold 908). The cooling plates 910 extend axially relative to the axis A, and the inlet support manifold 906 is arranged radially outward from the outlet support manifold 908. Although illustratively shown with the inlet on the radially outward side, the opposite may be true, with the inlet being on the radially inward side and the outlet being on the radially outward side, without departing from the scope of the present disclosure.

In accordance with embodiments of the present disclosure, the cooling fluid may be a single-phase fluid such as, and without limitation, propylene glycol/water mixtures, ethylene glycol/water mixtures, hydrocarbon-based dielectric fluids, engineered fluids (e.g., fluorinated ketones), or the like. In other embodiments, the cooling fluid may be a two-phase fluid such as, and without limitation, typical refrigerants such as R134a, R1234yf, R1234ze, R1233zd, or, for example, any Hydrofluoroolefin, Hydrofluorocarbon, or Hydrofluoroether, etc. It will be appreciated that these cooling fluids are examples and various other cooling fluids may be employed without departing from the scope of the present disclosure. In accordance with some embodiments, the cantilever structure of various embodiments may be formed from a non-magnetic and/or non-ferrous material, such as, and without limitation, Inconel or titanium.

Figure 10:
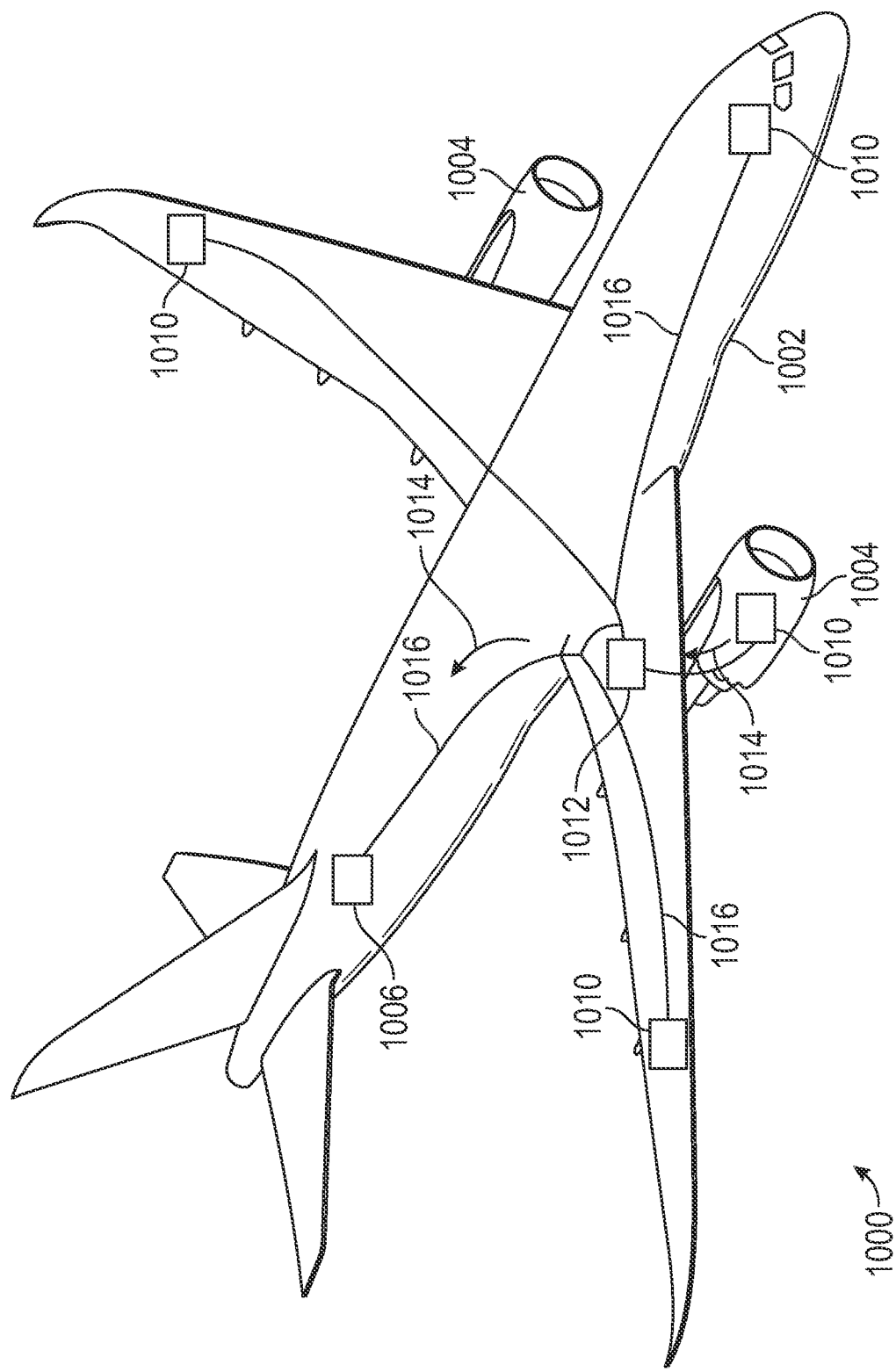
FIG. 10 is a schematic view of a power system of an aircraft that may employ embodiments of the present disclosure.

Referring now to FIG. 10, a power system 1000 of an aircraft 1002 is schematically shown. The power system 1000 includes one or more engines 1004, one or more electric motors 1006, a power bus electrically connecting the various power sources 1004, 1006, and a plurality of electrical devices 1010 that may be powered by the engines 1004 and/or motors 1006. The power system 1000 includes a power distribution system 1012 that distributes power 1014 through power lines or cables 1016. The electric motors 1006 be configured as the aircraft electric motors shown and described herein and/or incorporate features as described herein.

Advantageously, embodiments of the present disclosure provide for improved electric motors for aircraft and aviation applications. The aircraft electric motors of the present disclosure may provide for electric motors having reduced motor weight, increased efficiency, increased power density, and increased manufacturability. Advantageously, embodiments of the present disclosure are directed to cantilevered stator assemblies which may result in reduced weight and complexity of an electric motor system. The cantilever configuration is provided from a cooling system assembly that provides both cooling and structural support to the stator.

The terms "about" and "substantially" are intended to include the degree of error associated with measurement of the particular quantity based upon the equipment available at the time of filing the application. For example, "about" or "substantially" can include a range of #8% or 5%, or 2% of a given value. The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made, and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure is not limited to the particular embodiment disclosed as the best mode contemplated for carrying out this present disclosure, but that the present disclosure will include all embodiments falling within the scope of the claims.

What is claimed is:

1. A stator for an aircraft electric motor comprising:
a cantilever structure having a supported end and an unsupported end, wherein the cantilever structure includes an inlet support manifold and an outlet support manifold arranged at the supported end and a plurality of cooling plates extending from the inlet support manifold and the outlet support manifold to the unsupported end;
a plurality of coils arranged between and in thermal contact with the cooling plates;
a core passing through the plurality of coils and the plurality of cooling plates; and
a plurality of magnetic teeth wherein the cooling plates define gaps between adjacent cooling plates and each gap includes a coil of the plurality of coils and a magnetic tooth of the plurality of magnetic teeth,
wherein each cooling plate defines a cooling channel that fluidly couples the inlet support manifold and the outlet support manifold, and
wherein the coils and the core are structurally supported by the plurality of cooling plates in a cantilevered manner at the supported end.

2. The stator of claim 1, wherein the cantilever structure defines an annular shape and defining an axis through a center of the annular shape.

3. The stator of claim 2, wherein the inlet support manifold is arranged radially outward from the outlet support manifold.

4. The stator of claim 2, wherein each of the inlet support manifold and the outlet support manifold are arranged at the same axial position relative to the axis through the center of the annular shape.

5. The stator of claim 1, further comprising a bonding material configured to bond the plurality of cooling plates, the core, and the plurality of coils together.

6. The stator of claim 5, wherein the bonding material comprises at least one of an epoxy material, a thermoset material, a thermoplastic material, or a polymer material.

7. The stator of claim 1, further comprising a cooling fluid within the cooling channels of the plurality of cooling plates.

8. A stator for an aircraft electric motor comprising:
a cantilever structure having a supported end and an unsupported end, wherein the cantilever structure includes an inlet support manifold and an outlet support manifold arranged at the supported end and a plurality of cooling plates extending from the inlet support manifold and the outlet support manifold to the unsupported end;
a plurality of coils arranged between and in thermal contact with the cooling plates; and
a core passing through the plurality of coils and the plurality of cooling plates,
wherein each cooling plate defines a cooling channel that fluidly couples the inlet support manifold and the outlet support manifold,
wherein the coils and the core are structurally supported by the plurality of cooling plates in a cantilevered manner at the supported end, and
wherein the inlet support manifold defines an inlet cavity therein and the outlet support manifold defines an outlet cavity therein, wherein the inlet cavity is fluidly coupled to the outlet cavity by the cooling channels within the plurality of cooling plates.

9. The stator of claim 8, wherein the cantilever structure defines an annular shape and defining an axis through a center of the annular shape.

10. The stator of claim 9, wherein the inlet support manifold is arranged radially outward from the outlet support manifold.

11. The stator of claim 9, wherein each of the inlet support manifold and the outlet support manifold are arranged at the same axial position relative to the axis through the center of the annular shape.

12. The stator of claim 8, further comprising a bonding material configured to bond the plurality of cooling plates, the core, and the plurality of coils together.

13. The stator of claim 12, wherein the bonding material comprises at least one of an epoxy material, a thermoset material, a thermoplastic material, or a polymer material.

14. The stator of claim 8, further comprising a cooling fluid within the cooling channels of the plurality of cooling plates.

15. A stator for an aircraft electric motor comprising:

a cantilever structure having a supported end and an unsupported end, wherein the cantilever structure includes an inlet support manifold and an outlet support manifold arranged at the supported end and a plurality of cooling plates extending from the inlet support manifold and the outlet support manifold to the unsupported end;

a plurality of coils arranged between and in thermal contact with the cooling plates; and a core passing through the plurality of coils and the plurality of cooling plates, wherein each cooling plate defines a cooling channel that fluidly couples the inlet support manifold and the outlet support manifold, wherein the coils and the core are structurally supported by the plurality of cooling plates in a cantilevered manner at the supported end, and wherein the inlet support manifold defines a first inlet cavity and a second inlet cavity, wherein the first inlet cavity is fluidly coupled to the second inlet cavity by at least one metering aperture and the second inlet cavity is fluidly coupled to the cooling channels of the plurality of cooling plates.

16. The stator of claim 15, wherein the cantilever structure defines an annular shape and defining an axis through a center of the annular shape.

17. The stator of claim 16, wherein the inlet support manifold is arranged radially outward from the outlet support manifold.

18. The stator of claim 16, wherein each of the inlet support manifold and the outlet support manifold are arranged at the same axial position relative to the axis through the center of the annular shape.

19. The stator of claim 15, further comprising a bonding material configured to bond the plurality of cooling plates, the core, and the plurality of coils together.

20. The stator of claim 15, further comprising a cooling fluid within the cooling channels of the plurality of cooling plates.

\* \* \* \* \*